(12) United States Patent
Iwaji et al.

(10) Patent No.: US 6,690,137 B2
(45) Date of Patent: Feb. 10, 2004

(54) SENSORLESS CONTROL SYSTEM FOR SYNCHRONOUS MOTOR

(75) Inventors: Yoshitaka Iwaji, Tokyo (JP); Tsunehiro Endo, Tokyo (JP); Kiyoshi Sakamoto, Tokyo (JP); Yuhachi Takakura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 7 days.

(21) Appl. No.: 10/053,694

(22) Filed: Jan. 24, 2002

(65) Prior Publication Data

US 2003/0030404 A1 Feb. 13, 2003

(30) Foreign Application Priority Data

Jun. 6, 2001 (JP) .......................... 2001-170425

(51) Int. Cl.[7] .............................. H02P 1/46; H02P 5/28; H02P 7/36
(52) U.S. Cl. ...................... 318/700; 318/138; 318/254; 318/430; 318/432; 318/434; 318/439; 318/720; 318/724
(58) Field of Search ................ 318/700, 720, 318/724, 138, 254, 439, 432, 434, 430

(56) References Cited

U.S. PATENT DOCUMENTS

| | | | | |
|---|---|---|---|---|
| 4,511,835 A | * | 4/1985 | Studtmann | 318/700 |
| 4,855,652 A | * | 8/1989 | Yamashita et al. | 318/268 |
| 5,420,492 A | * | 5/1995 | Sood et al. | 318/809 |
| 5,739,650 A | * | 4/1998 | Kimura et al. | 318/254 |
| 5,796,228 A | * | 8/1998 | Kojima et al. | 318/605 |
| 5,920,161 A | * | 7/1999 | Obara et al. | 318/139 |
| 6,075,328 A | * | 6/2000 | Notohara et al. | 318/254 |
| 6,208,109 B1 | * | 3/2001 | Yamai et al. | 318/716 |
| 6,281,656 B1 | * | 8/2001 | Masaki et al. | 318/700 |
| 6,396,229 B1 | * | 5/2002 | Sakamoto et al. | 318/439 |
| 6,462,492 B1 | * | 10/2002 | Sakamoto et al. | 318/254 |
| 6,501,243 B1 | * | 12/2002 | Kaneko et al. | 318/700 |

FOREIGN PATENT DOCUMENTS

| | | |
|---|---|---|
| JP | 06-153526 | 5/1994 |
| JP | 08-019263 | 1/1996 |
| JP | 2001-161090 | 6/2001 |

* cited by examiner

Primary Examiner—Robert Nappi
Assistant Examiner—Tyrone Smith
(74) Attorney, Agent, or Firm—Crowell & Moring LLP

(57) ABSTRACT

A synchronous motor drive system in accordance with the present invention detects a DC current of an inverter which drives a synchronous motor, and based on the magnitude of the current, estimates torque current components that flow through the motor, and then based on the estimated value, determines the voltage which is applied to the motor, and finally estimates and computes the magnetic pole axis located inside the motor using the estimated value of the torque current.

23 Claims, 19 Drawing Sheets

Prior Art

US 6,690,137 B2

SENSORLESS CONTROL SYSTEM FOR SYNCHRONOUS MOTOR

BACKGROUND OF THE INVENTION

1. Field of the Invention

The present invention relates to a control system for a synchronous motor, and more particularly to a highly accurate and high-performance synchronous motor drive system whose controlling mechanism is made simple by not using sensors to detect the motor's speed and position or a motor current sensor.

2. Descriptions of Prior Art

FIG. 33 shows a method for controlling a synchronous motor that does not detect the synchronous motor's magnetic pole position or motor current and does not use a position sensor either. This prior art uses a current sensor that detects a motor current instead of using a position sensor. This prior art is based on a synchronous motor vector control that uses a position sensor, but employs a magnetic pole position estimator and a speed estimator instead of a position sensor (hereinafter, this method is referred to as a "sensorless vector control method"). The configuration of this method, except for a magnetic pole position detecting section and a speed detecting section, is the same configuration as a vector control method that uses a position sensor.

In FIG. 33, there are shown a speed command generator 1 for generating a rotational speed command ωr*, a motor controller 2Y, a PWM generator 3 for converting a voltage command to a PWM (pulse-width modulation) pulse, an inverter 4, a synchronous motor 5, a conversion gain 6 for converting a mechanical angle frequency to an electrical angle frequency, an Id* generator 8 for generating a d-axis current command Id*, a voltage command computing device 11 for computing dq-axis voltage commands Vdc* and vqc*, a dq inverse converter 12 for converting a dq-axis value to a three-phase alternating current value, an adder 13 for adding and subtracting signals, a speed controller 27 for adjusting Iq* so that an estimated speed value agrees with a speed command, a current controller 30 for correcting voltage commands Vdc* and Vqc* so that estimated current values Idc and Iqc agree with command values Id* and Iq* respectively, a magnetic pole position estimator 37 for estimating the magnetic pole axis of the motor, a speed estimator 38 for estimating a rotational speed of the motor, a dq coordinate transformer 39 for transforming a three-phase alternating current (AC) value to a rotary coordinate value, a direct current (DC) power source 41 for the inverter, a main-circuit section 42 of the inverter, a gate driver 43 for turning on and off semiconductor switching elements Sup to Swn of the inverter main-circuit based on a PWM pulse and a current sensor 44 for detecting a current of the motor.

Referring also to FIG. 33, a magnetic pole position estimator 37 corresponds to a magnetic pole position sensor and a speed estimator 38 corresponds to a speed sensor. In addition, as is the case with the vector controller having a position sensor, a speed controller 27 and a current controller 30 are provided to automatically make adjustments so that the speed and current agree with each command value. This is, for example, described in "Sensorless control of the permanent magnet synchronous motor's position by direct estimation calculation of axis error" on pages 963 to 966 of the proceedings III, No.97 issued by the Reports of JIASC Conference 2000, Japan.

A prior art of a control method which uses neither a position sensor nor a motor current sensor, shown in FIG. 34, has been disclosed in Japanese Application Patent Laid-Open Publication No. Hei 06-153526 and No. Hei 08-19263. Referring now to FIG. 34, a motor current estimator 40 estimates and computes a motor current from a DC current I0 of an inverter and a PWM pulse shape. And the same reference numerals shown in FIG. 33 are employed for denoting the same devices.

In FIG. 34, a motor current is not directly detected, but a DC current of an inverter is detected by a current sensor 44. A motor current estimator 40 estimates a motor current from the detected value I0 of the DC current and the output pulse shape of a PWM generator 3 and then outputs the estimated value I1c to a controller 2Y. Based on the I1c, the controller 2Y performs the vector-type sensorless control, for example, in the same manner as shown in FIG. 33.

Next, operations of a motor current estimator 40 will be described with reference to FIGS. 35(a) to (e). FIGS. 35(a) to (c) illustrate shapes of a PWM pulse for each phase. Plus-side switches (Sup, Svp and Swp) are turned on when the value of each phase is "1" and minus-side switches (Sun, Svn and Swn) are turned on when the value of each phase is "0". If there is a motor current, as shown in FIG. 35(d), the detected DC current value I0 of an inverter would appear as a waveform shown in FIG. 35(e). The waveform in FIG. 35(e) has four modes as described below:

(1) Mode 1: Sup=ON, Svp=ON,

Swp=ON→I0=0

(2) Mode 2: Sup=ON, Svp=ON,

Swp=OFF→I0=Iu+Iv=−Iw (3) Mode 3: Sup=ON, Svp=OFF,

Swp=OFF→I0=Iu (4) Mode 4: Sup=OFF, Svp=OFF, Swp=OFF→I0=0

Accordingly, "Iu" can be detected by using Mode (3) for detecting a DC current and "Iw" can be detected by using Mode (2). "Iv" can be calculated from Iu and Iw. Thus, it is possible to reproduce a motor current using the switching condition of the inverter main circuit and DC current values. As a result, if a motor current can be estimated, the above-mentioned sensorless vector control method would be able to be realized.

SUMMARY OF THE INVENTION

In the sensorless vector control method shown in FIG. 33, a motor must be equipped with a current sensor 44. However, there is a problem that reliability may be decreased by using a sensor 44 and a cost problem also arises because an expensive current sensor may be required to realize highly accurate control. Further, the method shown in FIG. 34 has a problem of high-frequency oscillations (ringing) of a current caused by switching operations. The possibilities of ringing occurring increase as the length of the wiring cable for the motor becomes longer, which makes it difficult to detect necessary current values. Furthermore, when a rotational frequency of the motor is low, the width of a PWM pulse becomes narrow, therefore, even though the wiring cable is shortened, the method is affected by noise and detection accuracy deteriorates.

An object of the present invention is to provide a high-performance drive system for a synchronous motor which ensures reliability without having a motor current sensor and is affected little by noise such as ringing.

A synchronous motor drive system in accordance with the present invention detects a DC current of an inverter which drives a synchronous motor, and based on the magnitude of the current, estimates torque current components that flow through the motor, and then based on the estimated value, determines the voltage which is applied to the motor, and finally estimates and computes the magnetic pole axis located inside the motor by using the estimated value of the torque current.

A synchronous motor drive system in accordance with the present invention comprises a synchronous motor, an inverter which applies alternating current to the synchronous motor, a DC power source which supplies power to the inverter, means for detecting a current supplied from the DC power source to said inverter, means for giving a rotation command to said synchronous motor, means for giving current commands Id* and Iq*, Id* on the dc-axis that is assumed to be the magnetic pole axis located inside said synchronous motor and Iq* on the qc-axis that is perpendicular to the dc-axis, and means for computing dc-qc-axis voltage commands based on said current commands Id* and Iq* and said rotation command, wherein control signals are sent to said inverter based on the voltage commands, torque current components inside said synchronous motor are estimated and computed based on the detected current value of said DC power source, and then said current command Iq* is generated based on the computed value.

DESCRIPTION OF EMBODIMENTS OF THE INVENTION

Embodiments of the present invention will hereinafter be described in detail with reference to drawings.

Embodiment 1

Figure 1:
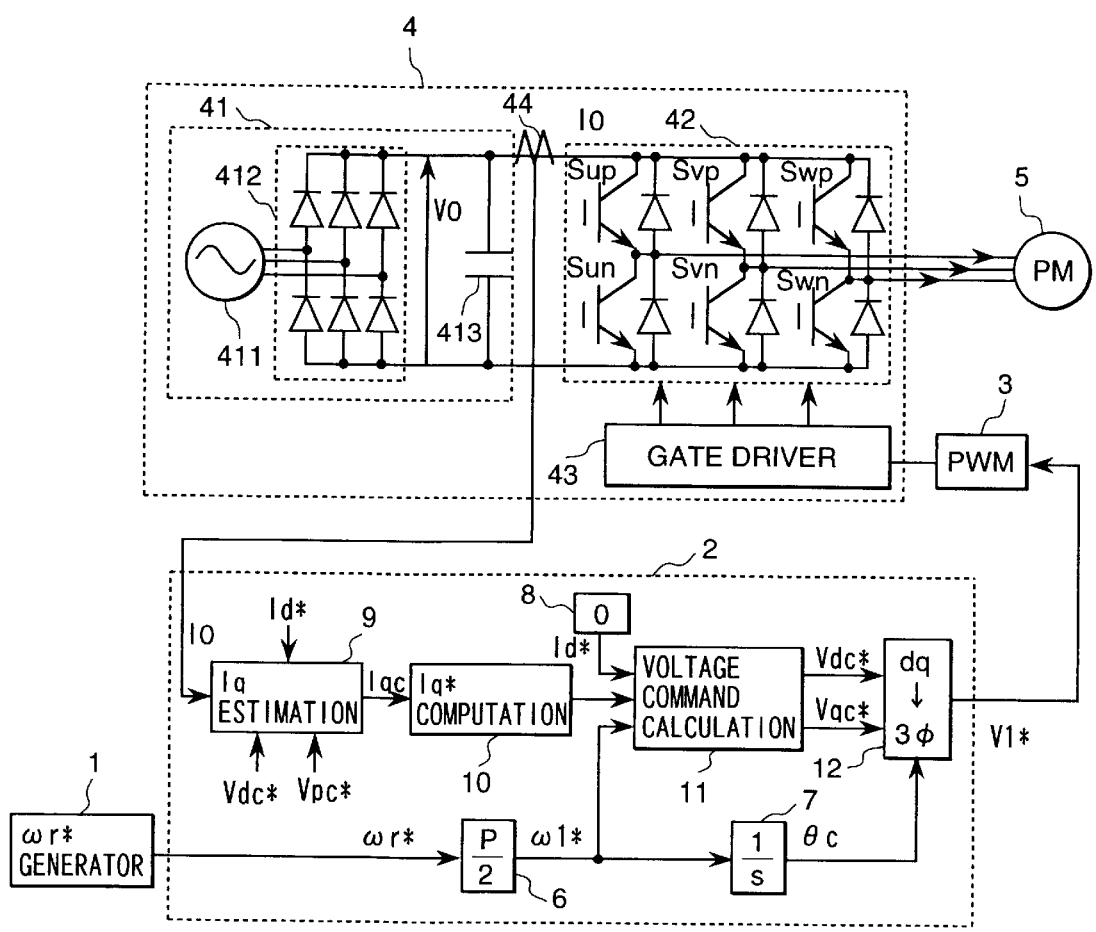
FIG. 1 is a configuration diagram of a first embodiment of the present invention.

FIG. 1 is a configuration diagram of a first embodiment of the present invention. In FIG. 1, there are shown a speed command generator 1 which gives a rotational speed command $\omega r^*$ to a motor, a controller 2 which computes the voltage applied to the motor, a PWM (pulse-width modulation) generator 3 which generates pulses to drive an inverter 4 based on a voltage command V1*, an inverter 4 which consists of semiconductor switching elements for driving the motor, a synchronous motor 5 which is a control target, a conversion gain 6 (P denotes the number of poles of the motor) which converts a rotational speed command $\omega r^*$ to an electrical angle frequency command $\omega 1^*$ of the motor, an integrator 7 which computes an AC phase θc in the controller based on the electrical angle frequency command $\omega 1^*$, an Id* generator 8 which gives a current command Id* of the magnetic pole axis component (d-axis component) of the motor, an Iq estimator 9 which estimates and computes a motor torque current component based on the detected DC current value I0 of the inverter, an Iq* computing device 10 which computes a current command Iq* based on the estimated value Iqc of a motor torque current component (q-axis component), a voltage command computing device 11 which computes dc-qc-axis voltage commands Vdc* and Vqc* based on the electrical angle frequency command ω1*, current command Id* and current command Iq*, a dq inverse converter 12 which converts the dc-qc-axis voltage commands Vdc* and Vqc* to the three-phase AC axis value, a DC power source section 41 which consists of a main circuit power supply of the inverter 4, a main circuit section 42 of the inverter 4, a gate driver 43 which generates gate signals to the main circuit, a current sensor 44 which detects a DC current of the inverter 4, a three-phase AC power source 411 which supplies power to the inverter 4, a diode bridge 412 which rectifies the three-phase AC power source, and a smoothing capacitor 413 which suppresses a ripple component contained in the DC power source.

Figure 2:
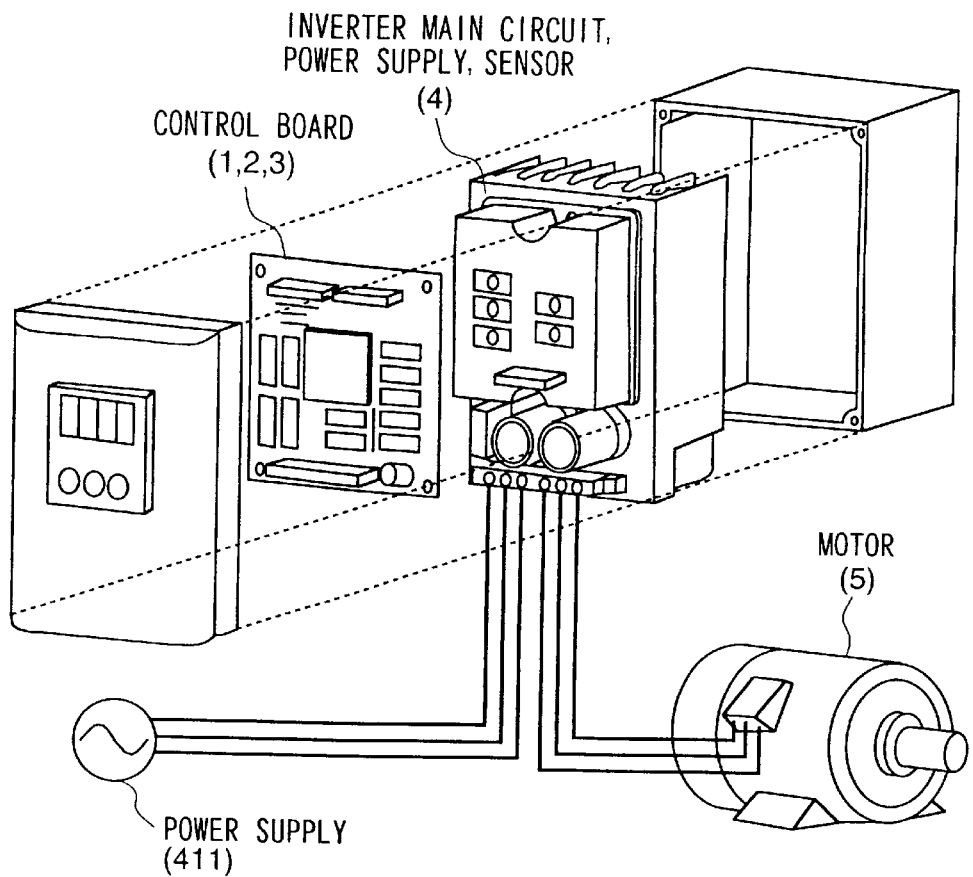
FIG. 2 a schematic diagram for a device equipped with a motor drive system according to a first embodiment.

A motor drive system of a first embodiment, shown in FIG. 2, consists of an AC power source, a controller and inverter section, and a motor. As shown in FIG. 2, functions represented by the above-mentioned reference numerals 1 to 3 are provided on the control board, which is located in the controller and inverter section, thereby constituting a digital circuit which is based on a micro processor. An inverter main circuit section and a current detecting section are also packaged in one device.

Next, operations of a first embodiment will be described with reference to FIG. 1. Based on a speed command ωr*, an electrical angle frequency command ω1* of the motor can be obtained as the output of a conversion gain 6. An integrator 7 integrates the electrical angle frequency command ω1* to obtain an AC phase θc in the controller.

Further, an Iq estimator 9 estimates and computes a motor torque current component based on the detected DC current value I0, and an Iq* computing device computes a current command Iq* based on the estimated value Iqc of the motor torque current component. An Id* generator 8 generates a specified current command Id*, and, for example, when a rotor of the motor is a non-salient type rotor, the generator 8 gives a current command Id*=0. A voltage command computing device 11 computes voltage commands Vdc* and Vqc*, which are the voltage applied to the synchronous motor 5, based on the electrical angle frequency command ω1* and current commands Id* and Iq* of the motor according to the following equation:

$$Vdc^* = R \cdot Id^* - \omega 1^* \cdot Lq \cdot Iq^* \tag{1}$$
$$Vqc^* = \omega 1^* \cdot Ld \cdot Id^* + R \cdot Iq^* + Ke \cdot \omega 1^*$$

wherein R is motor resistance, Ld is d-axis inductance, Lq is q-axis inductance and Ke is a power generation constant of a motor.

An arithmetic expression of Equation (1) is used for a normal vector control, and, for example, described in Equation (4.6) on page 78 of "Practices of theory and design of the AC servo system" by Hidehiko Sugimoto, Sogo Denshi Shuppan.

Next, coordinate transformation will be performed to transform voltage commands Vdc* and Vqc* obtained by Equation (1) into the three-phase AC axis voltage command value V1* using an AC phase θc. A PWM generator 3 converts the voltage command value V1* to a PWM pulse signal. A gate driver 43 drives switching elements according to this pulse signal and applies the voltage corresponding to the voltage commands Vdc* and Vqc* to a synchronous motor 5.

Figure 3:
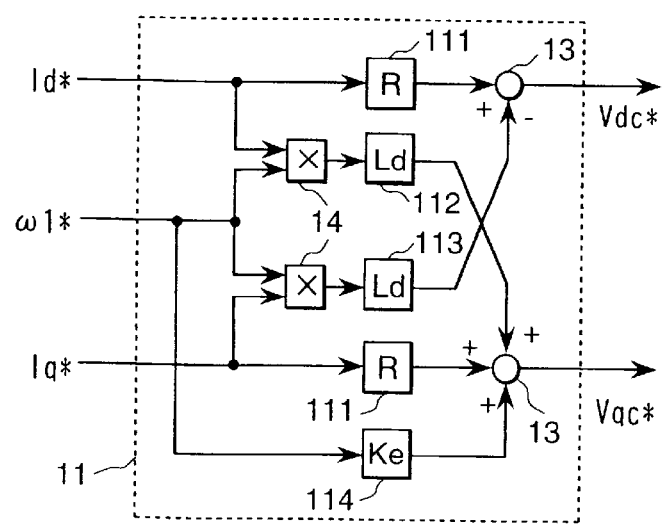
FIG. 3 is a configuration diagram of a voltage command computing device of a first embodiment.

Next, operations of each section will be described. A voltage command computing device 11 computes voltage commands by Equation (1). Equation (1) can be expressed in a block diagram as shown in FIG. 3. In FIG. 3, there are shown an adder 13 (including subtraction), a multiplier 14, a gain 111 corresponding to a resistance (R) of a motor, a gain 112 corresponding to d-axis inductance (Ld), a gain 113 corresponding to q-axis inductance (Lq), and a gain 114 corresponding to a power generation constant (Ke).

Figure 33:
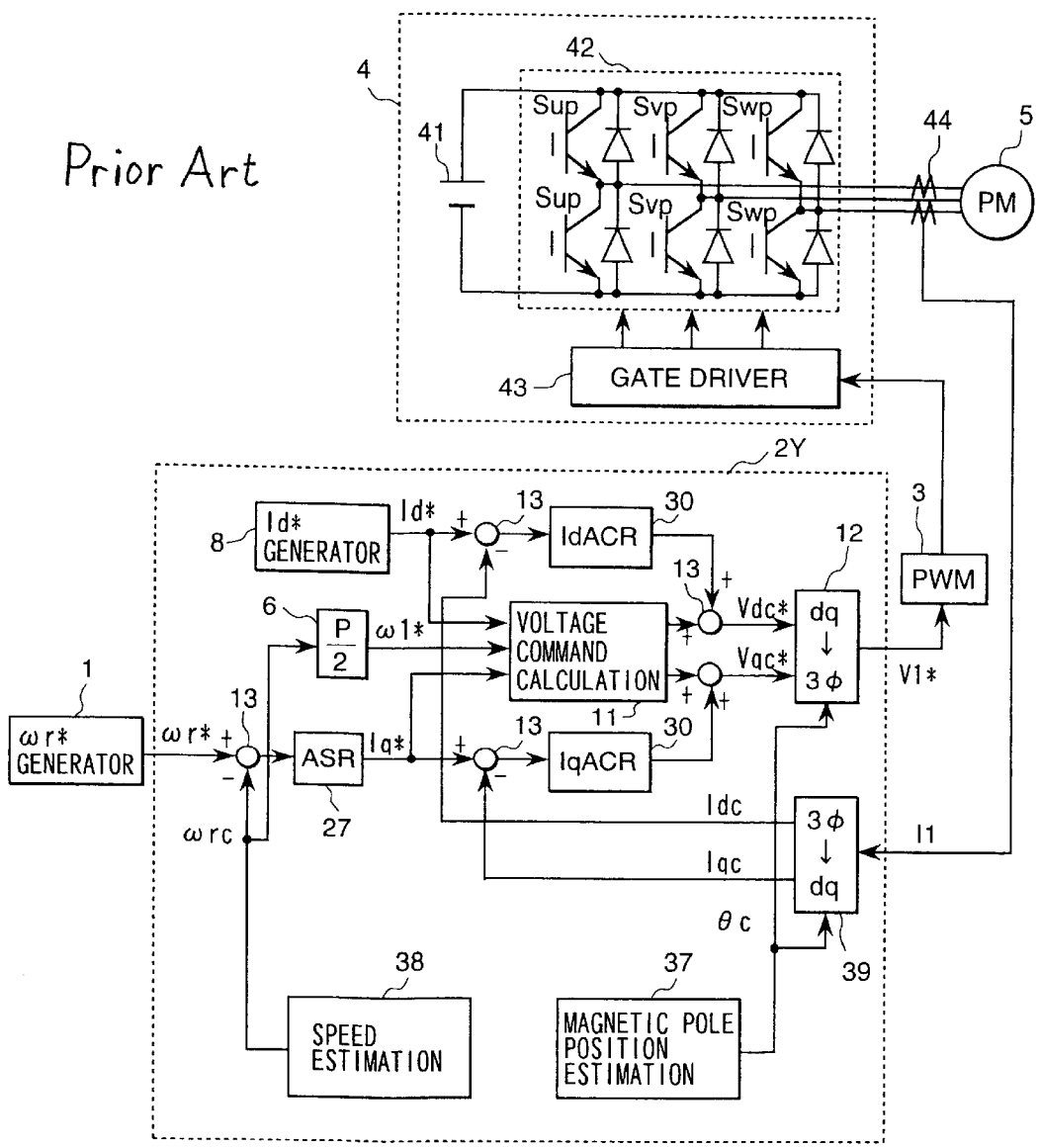
FIG. 33 is a configuration diagram of a synchronous motor vector control system according to a prior art which does not use position and speed sensors.
Figure 34:
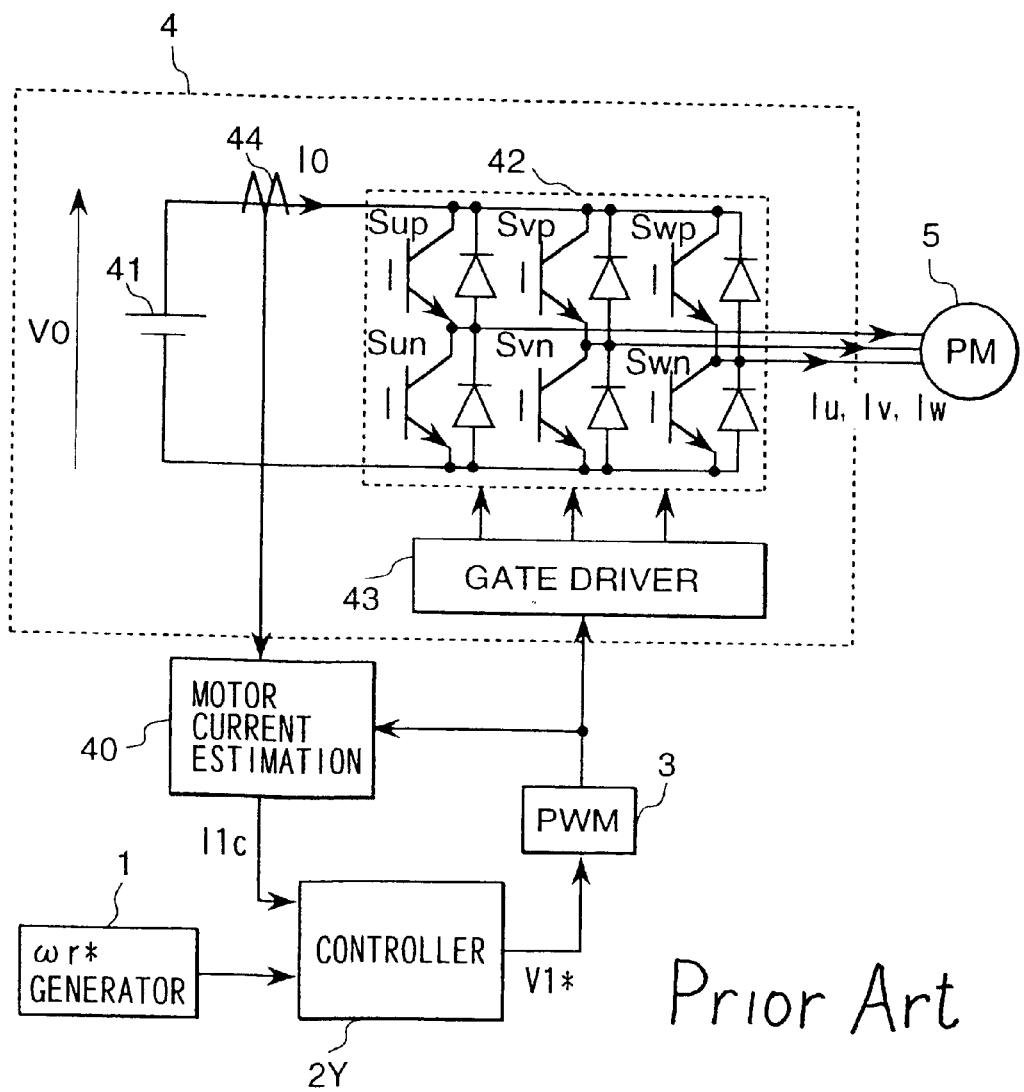
FIG. 34 is a configuration diagram of a synchronous motor drive system according to a prior art which does not use a motor current sensor.
Figure 35:
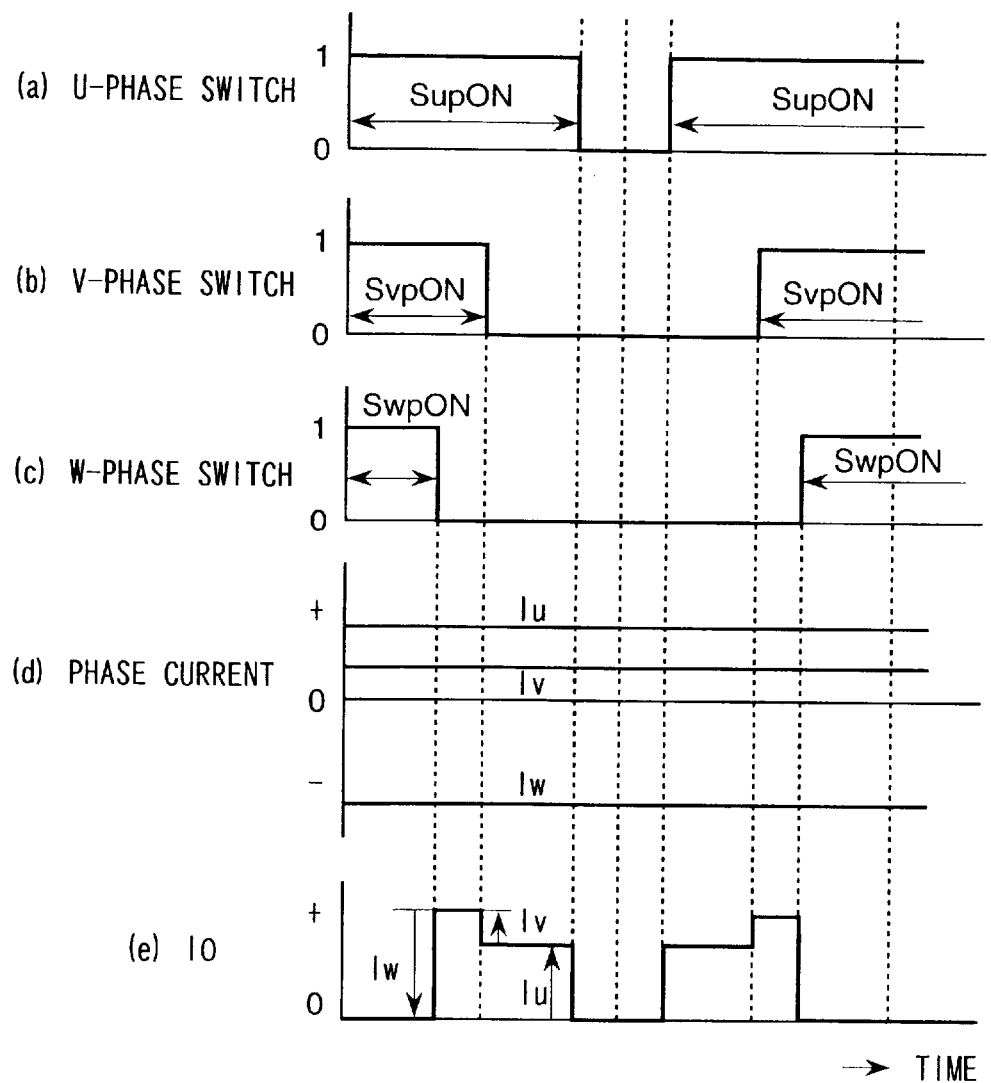
FIG. 35 shows the operations of a synchronous motor drive system according to a prior art which does not use a motor current sensor.

As shown in Equation (1) and FIG. 3, a voltage command computing device uses the motor constants R, Ld, Lq and Ke for computation. When those motor constants are accurate, the motor drives at a specified rotational speed and current value according to the command values. The electrical angle frequency command ω1* and the current command Id* can be given to a voltage command computing device 11 regardless of the motor's loading condition, while the current command Iq* should be given according to the torque necessary for the motor. If a difference occurs between the current command Iq* and an actual torque load, the magnetic pole axis and the control axis of the motor do not agree with each other, causing instability and insufficient torque. Therefore, the key point of the control is how to create the current command Iq*. In the sensorless vector control method of a prior art shown in FIG. 33, the output of a speed controller 27 is regarded as a current command Iq*. However, the sensorless vector control method requires components, such as a speed estimator and a speed controller, thereby requiring that the control mechanism be complicated. Therefore, this embodiment estimates and computes a torque current component from the detected DC current value I0, and based on the estimated value Iqc, creates a current command Iq*.

Figure 4:
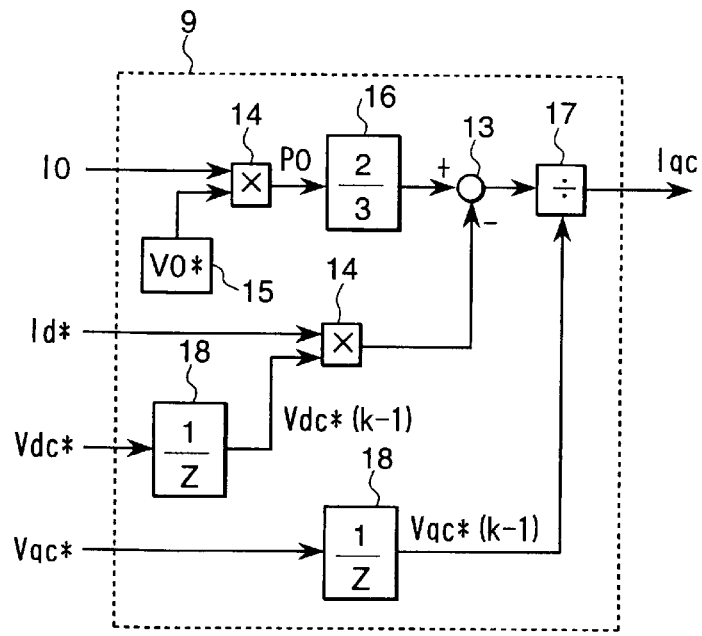
FIG. 4 is a configuration diagram of an Iq estimator of a first embodiment.

FIG. 4 shows the configuration of an Iq estimator 9. In FIG. 4, reference numerals 13 and 14 shown in FIG. 3 are employed for denoting the same devices. In FIG. 4, there are shown a V0* generator 15 which generates a DC voltage set value V0, a power conversion gain 16, a divider 17, and a delay device 18 which delays a signal by one sample period.

Next, operations of the Iq estimator 9 shown in FIG. 4 will be explained. The relation between a DC power source section and the dq coordinate axis with regard to the power consumed by the motor can be expressed with the following equation:

$$I0V0 = \frac{3}{2}(VdId + VqIq) \tag{2}$$

wherein coefficient ³⁄₂ is a coefficient for the case where relative transformation is used for the dq coordinate transformation. If absolute transformation is used, the coefficient would be 1. Equation (2) can be transformed as follows:

$$Iq = \frac{\frac{2}{3}I0V0 - VdId}{Vq} \tag{3}$$

This equation makes it possible to compute a motor torque current component Iq from the detected DC current value I0. However, a DC voltage V0 of an inverter, motor voltages Vd and Vq, and a current Id which flows through the motor cannot be directly detected. Therefore, using a set value or a command value, a motor torque current component Iq can be estimated and computed by the following equation:

$$Iqc = \frac{\frac{2}{3}I0V0^* - Vdc^*Id^*}{Vqc^*} \quad (4)$$

FIG. 4 expresses Equation (4) in a block diagram. Vdc* and vqc* use the values which are delayed by a computation period.

Next, a current command Iq* will be created using the estimated value Iqc of a torque current component. In FIG. 1, an Iq* computing device 10 computes a current command Iq* by the following equation:

$$Iq^* = \frac{1}{1+Tr \cdot s} \cdot Iqc \quad (5)$$

wherein Tr is a time constant and s is a Laplace operator.

Equation (5) uses a first-order lag filter, and besides this, the moving average value can be utilized. If a current command Iq* is directly used as an estimated torque current component value Iqc, positive operations cause the control system to become unstable; therefore, a lag element is provided to make the system stable. However, in a steady state, a fundamental wave component (i.e. DC component) of the estimated torque current component value Iqc agrees with a current command Iq*, and consequently, the magnetic pole axis in the motor matches the control axis thereby realizing a stable motor drive system. Thus, according to a first embodiment, it is possible to realize a motor drive system which has a very simple control mechanism and ensures stable drive of the motor.

Embodiment 2

Figure 5:
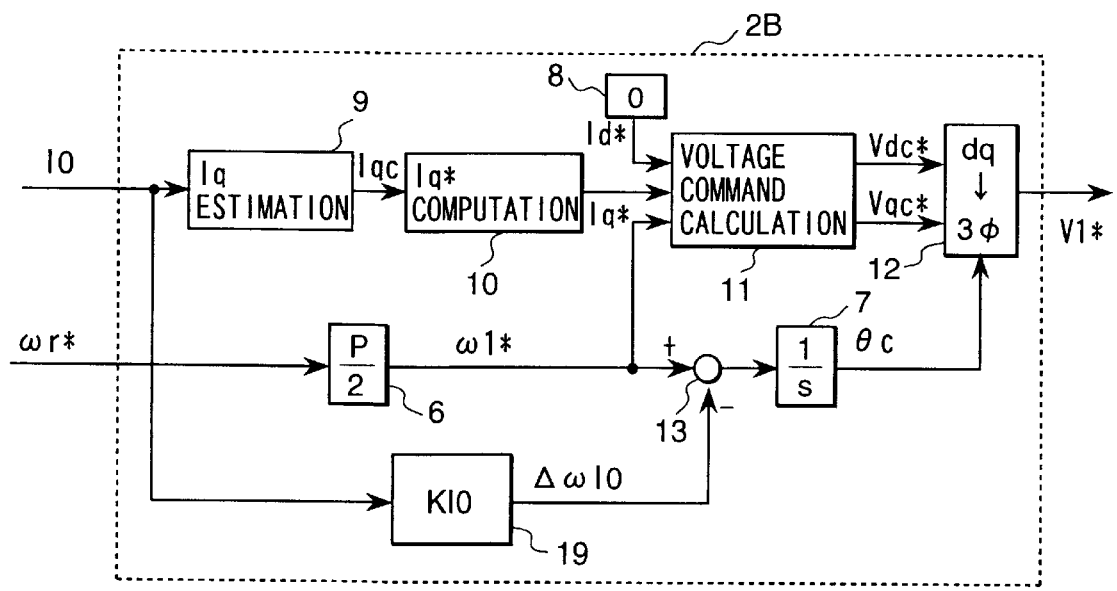
FIG. 5 is a configuration diagram of a second embodiment of the present invention.

A second embodiment of the present invention will be described in detail with reference to FIG. 5. FIG. 5 shows the configuration of a controller 2B which is used instead of the controller 2 shown in FIG. 1. Reference numerals 6 to 13 in FIG. 5 denote the same devices as represented in a first embodiment. An I0 damping gain 19 adds an adjustment value ΔωI0 to an electrical angle frequency command ω1* using a detected DC current value I0 of an inverter. This embodiment adds the I0 damping gain 19 to a first embodiment.

Next, operations of a second embodiment will be explained. As shown in Equation (2), as a motor load changes and power consumption increases, a detected DC current value I0 increases if the DC voltage V0 is constant. Therefore, when the detected DC current value I0 increases, load disturbance occurs causing the motor speed to decrease. To cope with the load fluctuation without causing step-out of a motor, the speed of the controller may be reduced according to the load. Therefore, if an electrical angle frequency command ω1* is corrected using the detected DC current value I0, it is possible to prevent step-out of the motor by changing a rotational speed of the motor according to the load disturbance.

Further, a correction amount ΔωI0 of an electrical angle frequency ω1* must be zero in a steady state. Therefore, an I0 damping gain 19 may consist of differential elements or incomplete differential elements. According to this embodiment, it is possible to ensure stable drive of the motor regardless of load fluctuations.

Embodiment 3

Figure 6:
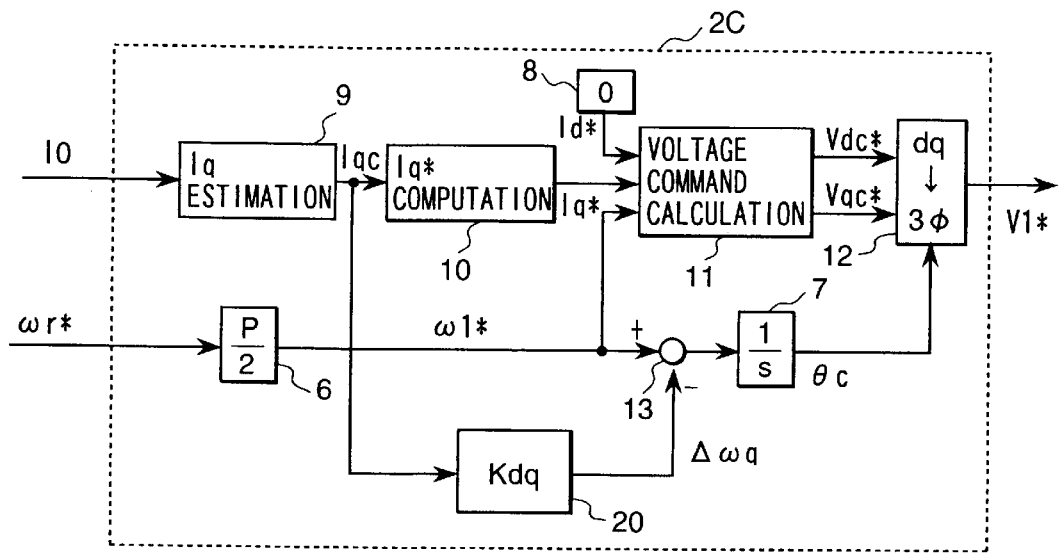
FIG. 6 is a configuration diagram of a third embodiment of the present invention.

A third embodiment of the present invention will be described with reference to FIG. 6. FIG. 6 shows the configuration of a controller 2C which is used instead of the controller 2 shown in a first embodiment. Reference numerals 6 to 13 in FIG. 6 denote the same devices as represented in a first embodiment. An Iq damping gain 20 adds an adjustment value Δωq to an electrical angle frequency command ω1* using the estimated torque current value Iqc. This embodiment adds the Iq damping gain 20 to a first embodiment.

Next, operations of a third embodiment will be described. A second embodiment uses a detected DC current value I0 to correct an electrical angle frequency command ω1*, while this embodiment uses an estimated torque current value Iqc to correct the electrical angle frequency command ω1*. The detected DC current value I0 is a physical quantity which fluctuates in response to power consumption of a motor, however, the value is not directly related to load torque. Therefore, in the area where motor speed is low, the detected DC current value I0 does not change much even if load torque fluctuations are large. Accordingly, to cope with load torque fluctuations, more accurate compensation for the electrical angle frequency command ω1* is possible by using a torque current component which has a strong mutual relationship with load torque. This embodiment uses the estimated torque current component value Iqc to correct the electrical angle frequency command ω1* so that stability can be improved to cope with torque disturbance in the low speed area.

Moreover, an adjustment value Δωq of an electrical angle frequency command ω1* must be zero in a steady state. As is the case with the I0 damping gain 19, an Iq damping gain 20 consists of differential elements or incomplete differential elements. This embodiment makes it possible to ensure stable drive of the motor regardless of torque load fluctuations in the low speed area.

Embodiment 4

Figure 7:
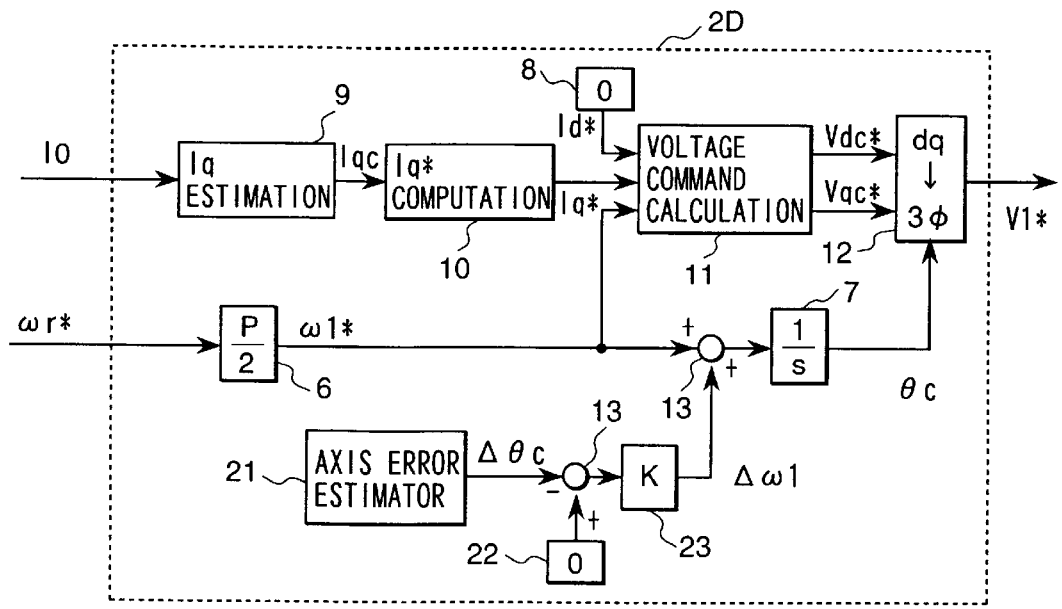
FIG. 7 is a configuration diagram of a fourth embodiment of the present invention.

A fourth embodiment of the present invention will be described with reference to FIG. 7 through FIG. 9. FIG. 7 shows the configuration of a controller 2D which is used instead of the controller 2 shown in FIG. 1. Reference numerals 6 to 13 in FIG. 7 denote the same devices as represented in the embodiments described above. An axis error estimator 21 estimates and computes the axis error between the motor's magnetic pole axis and the control axis, a zero generator 22 gives the axis error a zero command, and a magnetic pole axis estimation gain 23 computes an adjustment amount which is added to an electrical angle frequency command ω1* based on the axis error.

Next, operations of a fourth embodiment will be described with reference to FIG. 7. This embodiment adds reference numerals 21 to 23 to the controller 2 shown in FIG. 1. An axis error estimator 21 estimates and computes the error Δθ between the magnetic pole axis in the motor and the magnetic pole axis in the controller. As shown in FIG. 8, the error Δθ is defined as an error component of the control axis (i.e. defined as dc-qc-axis) obtained by observing from the dq-axis in the motor. An estimation error value Δθc can be computed by the following equation:

$$\Delta\theta c = Kh(Iqc - Iq^*) \quad (6)$$

Figure 9:
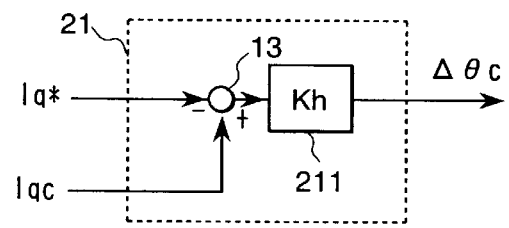
FIG. 9 is a configuration diagram of an axis error estimator of a fourth embodiment.

Equation (6) is embodied as a block diagram in FIG. 9. Reference numeral 211 denotes a proportional gain Kh used for computing the error. Iq* is a torque current command value which is a base of the voltage value applied to the motor. If the value agrees with a present torque current component (estimated value) Iqc, the axis error can be regarded as zero. If those values are different, it can be said that the error AO proportional to the value difference is occurring between the dq-axis and the dc-qc-axis. Accordingly, as shown in Equation (6), an estimated error value $\Delta\theta c$ can be obtained via a proportional gain Kh by computing the difference between Iq* and Iqc.

Figure 8:
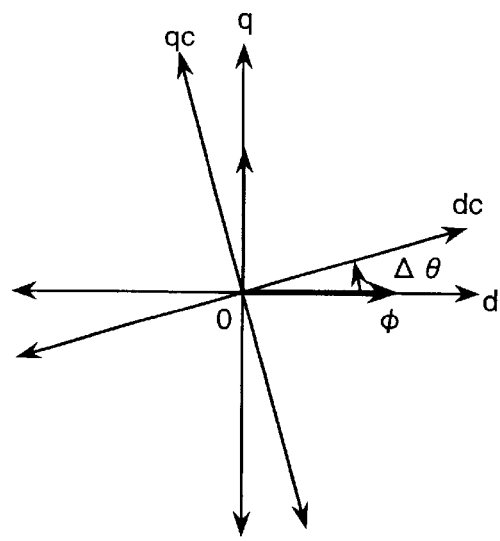
FIG. 8 is a vector diagram which shows the relation among the dc-qc-axis in the motor, the dc-qc-axis in the controller, and error Δθ.

When the estimated error value $\Delta\theta c$ is positive, as the relation is shown in FIG. 8, the control axis, i.e. dc-qc-axis, leads the dq-axis. Therefore, the error $\Delta\theta$ can be reduced by adding a correction amount $\Delta\omega 1$ ($\Delta\omega 1<0$ in this case) so as to reduce an electrical angle frequency command $\omega 1^*$. On the contrary, when the estimated error value $\Delta\theta c$ is negative, a correction amount $\Delta\omega 1$ is added to increase the electrical angle frequency command $\omega 1^*$. Those operations (PLL operation) are performed by devices or elements represented by numerals 21 to 23 in the block shown in FIG. 7. A magnetic pole axis estimation gain 23 is a coefficient which determines the convergence time of the estimated error value $\Delta\theta c$. Fundamentally, it may be a proportional gain and also proportional, integral, or differential elements may be combined. This embodiment compensates for a shift of the axis and realizes high-performance motor control.

Embodiment 5

Figure 10:
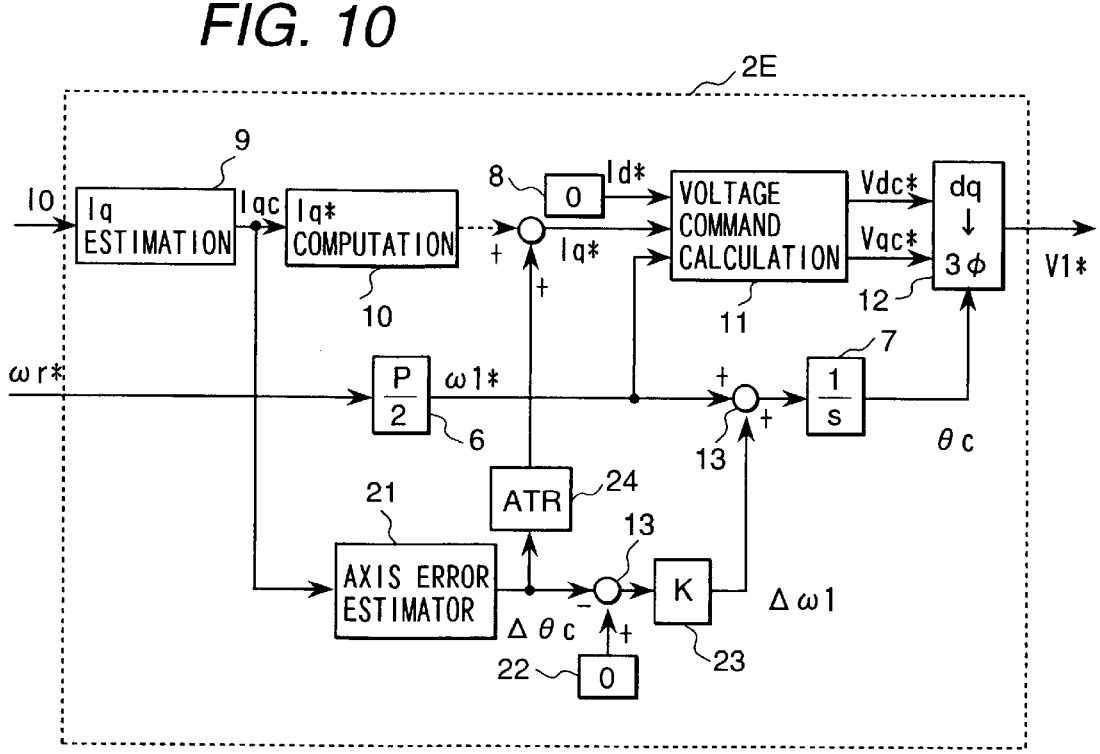
FIG. 10 is a configuration diagram of a fifth embodiment of the present invention.

A fifth embodiment of the present invention will be described with reference to FIG. 10. FIG. 10 shows the configuration of a controller 2E which is used instead of the controller 2 shown in FIG. 1. In FIG. 10, reference numerals 6 to 13, and 21 to 23 denote the same devices as represented in the embodiments described above. A torque controller 24 computes a current command Iq* based on the estimated error value $\Delta\theta c$ of the magnetic pole axis. The structural difference between this embodiment and a fourth embodiment is that this embodiment adds a torque controller 24 to a fourth embodiment.

Next, operations of a fifth embodiment will be explained with reference to FIG. 10. This embodiment uses an estimated error value $\Delta\theta c$ of the magnetic pole axis to determine a current command Iq*. Because a phase $\theta c$ of an AC voltage applied to the motor is mainly provided by integrating an electrical angle frequency command $\omega 1^*$, if a load suddenly changes, the estimated error value $\Delta\theta c$ immediately changes. Although the electrical angle frequency command $\omega 1^*$ is corrected via a magnetic pole axis estimation gain 23, it takes a certain period of time, depending on the preset PLL response, until the value becomes the same as the actual speed. Accordingly, by immediately determining a current command Iq* based on the change of the estimated error value $\Delta\theta c$, highly responsible torque control can be realized.

Further, when an Iq* computing device 10 shown in FIG. 10 is not used, the estimated error value $\Delta\theta c$ becomes zero in a steady state; therefore, an integral element becomes necessary in the torque controller. In this case, the torque controller 24 may basically consist of a PI (proportional and integral) control or a PID (proportional, integral and differential) control. On the contrary, the Iq* computing device is also used at the same time, the torque controller may consist of proportional elements or differential elements. According to this embodiment, a current command can be quickly obtained in response to torque changes.

Embodiment 6

Figure 11:
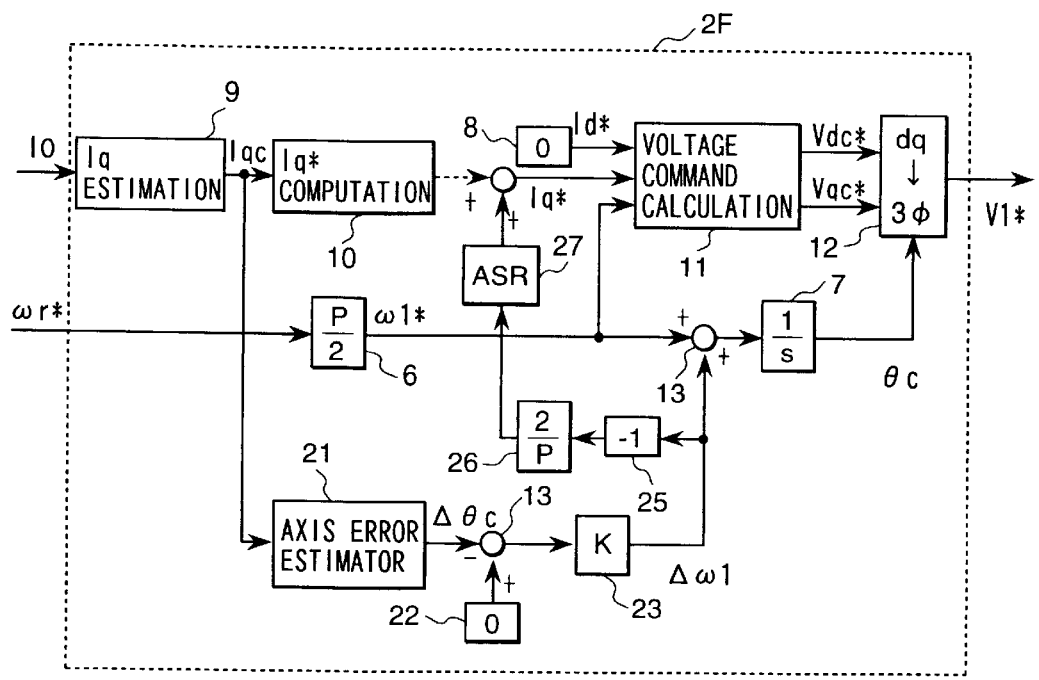
FIG. 11 is a configuration diagram of a sixth embodiment of the present invention.

A sixth embodiment of the present invention will be described with reference to FIG. 11. FIG. 11 shows the configuration of a controller 2F which is used instead of the controller 2 shown in FIG. 1. In FIG. 11, reference numerals 6 to 13, and 21 to 23 denote the same devices as represented in the embodiments described above. An inversion gain 25 inverts signal codes, a conversion gain 26 converts an electrical angle frequency to a mechanical angle frequency, and a speed controller 27 controls motor speed so that it remains constant. The difference between this embodiment and a fifth embodiment is that this embodiment adds the devices represented by reference numerals 25 to 27 to a fifth embodiment instead of using a torque controller 24 of a fifth embodiment.

Next, operations of a sixth embodiment will be described with reference to FIG. 11. This embodiment uses a correction amount $\Delta\omega 1$ which is output by a magnetic pole axis estimation gain 23 to create a current command Iq*. This embodiment employs a speed controller 27 to quickly converge speed deviation to zero so as to create a current command Iq*. A correction amount $\Delta\omega 1$ of an electrical angle frequency command $\omega 1^*$ is used as the speed deviation to simplify the control mechanism.

A correction amount $\Delta\omega 1$ which is output by a magnetic pole axis estimation gain 23 becomes positive when the actual motor speed is higher than a speed command of the controller; therefore, the code is inverted via an inversion gain 25. By doing so, the value becomes equivalent to the input (speed deviation) in a speed controller of a prior art, for example, in the speed controller 27 shown in FIG. 33. Next, the correction amount $\Delta\omega 1$ is divided by the number of pairs of poles P of the motor by using a conversion gain 26 and then converted to the deviation of a mechanical angle frequency. Finally, a current command Iq* is computed by using a speed controller 27. The speed controller 27 may use, for example, a PI control or a PID control which is used for controlling speed in a prior art. Further, when an Iq* computing device is also used at the same time, the speed controller may consist of proportional or differential elements, as shown in a fifth embodiment described above.

According to this embodiment, by constructing a speed controller based on a correction amount $\Delta\omega 1$ of an electrical angle frequency command $\omega 1^*$, it is possible to realize a motor drive system that has good speed tracking performance.

Embodiment 7

Figure 12:
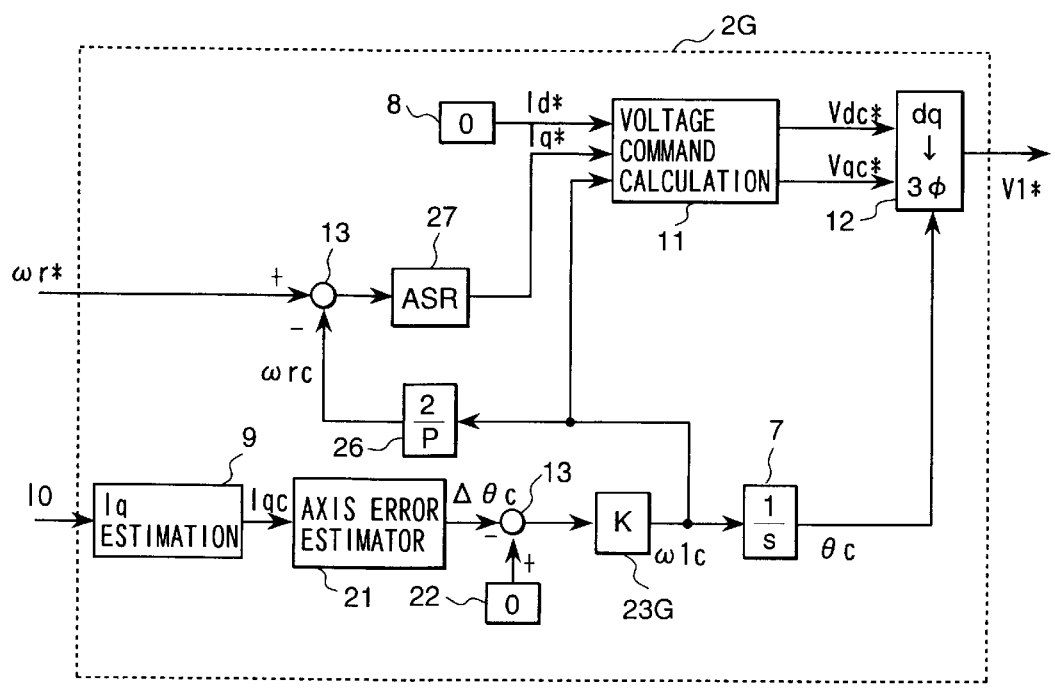
FIG. 12 is a configuration diagram of a seventh embodiment of the present invention.

A seventh embodiment of the present invention will be described with reference to FIG. 12. FIG. 12 shows the configuration of a controller 2G which is used instead of the controller 2 shown in FIG. 1. In FIG. 12, reference numerals 6 to 9, 11 to 13, 21, 22, 26 and 27 denote the same devices as represented in the embodiments described above. A magnetic pole axis estimation gain 23G consists of elements including integration. The difference between this embodiment and a sixth embodiment is as follows: This embodiment dose not have a loop for computing an AC phase $\theta c$ directly from an electrical angle frequency command $\omega 1^*$, but the AC phase $\theta c$ is computed based on the output of the magnetic pole axis estimation gain 23G; and a speed controller 27 computes a current command Iq* based on the output of the magnetic pole axis estimation gain and the deviation of a rotational speed command $\omega r^*$.

Next, operations of a seventh embodiment will be explained with reference to FIG. 12. This embodiment provides an integral element for a magnetic pole axis estimation gain 23G and computes an AC phase $\theta c$ based on the value. As a result, the AC phase $\theta c$ of the controller changes according to the actual motor speed thereby preventing step-out of a motor.

In a controller 2G, an Iq estimator 9 computes an estimated torque current component value Iqc using a detected DC current value I0, and based on the computed result, computes an estimated error value Δθc. A magnetic pole axis estimation gain 23G outputs an electrical angle frequency ω1c so that the estimated error value Δθc becomes zero. This magnetic pole axis estimation gain 23G also functions as a speed estimator, which is used to control speed. An estimated speed value ωrc can be obtained via a conversion gain 26 based on the electrical angle frequency ω1c which is the output from the magnetic pole axis estimation gain 23G. Finally, a current command Iq* can be obtained by inputting the deviation between the estimated speed value ωrc and the rotational speed command ωr*. In FIG. 12, a speed controller 27 has an integral element.

Additionally, there are no problems with using the magnetic pole axis estimation gain 23G of this embodiment for said embodiment (e.g. a fourth embodiment shown in FIG. 7). Thus, according to this embodiment, it is possible to realize a motor drive system which can track a speed command without depending on inertia of a motor and a loading device.

Figure 13:
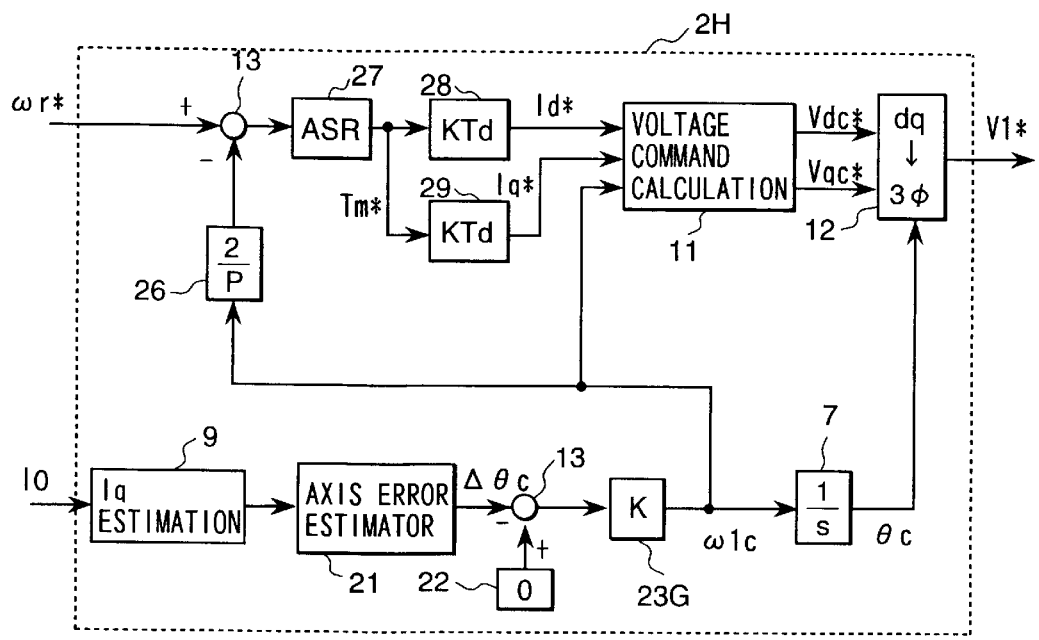
FIG. 13 is another configuration diagram of a seventh embodiment of the present invention.

Moreover, the embodiments shown in FIGS. 10, 11 and 12, use the output of a torque controller 24 or a speed controller 27 to obtain a current command Iq*, however, a current command Id* can also be obtained based on the output of the controllers. Instead of the controller shown in FIG. 12, FIG. 13 uses the output of a speed controller to compute current commands Id* and Iq*. In FIG. 13, reference numerals 7, 9, 11 to 13, 21, 22, 23G, 26 and 27 denote the same devices as represented in the embodiments described above. An Id* data table 28 and an Iq* data table 29 output current commands Id* and Iq*, respectively, based on the output of the speed controller.

In the case of a salient-type synchronous motor, it is possible to improve efficiency by using not only permanent magnet torque but also reluctance torque which utilizes the salient performance of the motor. In that case, a current command Id* is not always controlled at zero, but current commands Id* and Iq* which minimize the value of the total current flowing through the motor are given according to the necessary torque. In the case of FIG. 13, the output of the speed controller is regarded as a torque command Tm* and current commands Id* and Iq* required for the torque can be obtained from each data table. A method of obtaining current commands Id* and Iq* from a torque command Tm* has been disclosed, for example, in FIGS. 2 and 3 of Japanese Application Patent Laid-Open Publication No. 2000-116198.

Embodiment 8

Figure 14:
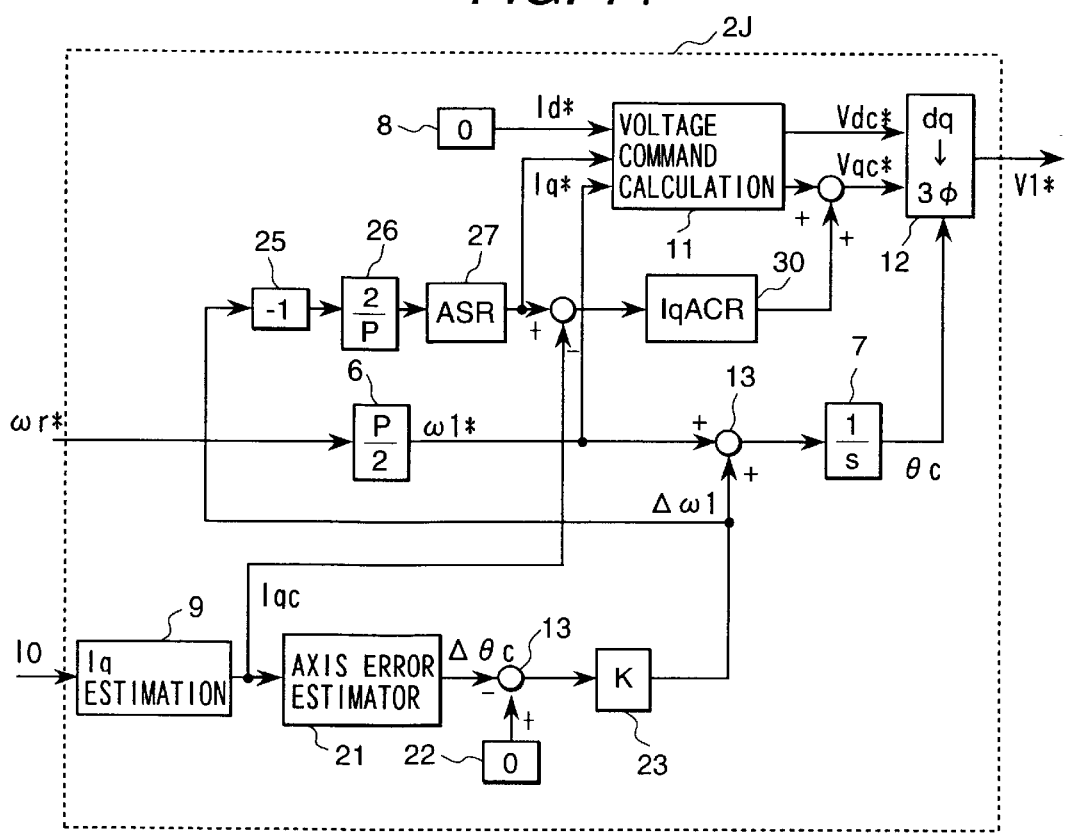
FIG. 14 is a configuration diagram of an eighth embodiment of the present invention.

An eighth embodiment of the present invention will be described with reference to FIG. 14. FIG. 14 shows the configuration of a controller 2J which is used instead of the controller 2 shown in FIG. 1. In FIG. 14, reference numerals 6 to 9, 11 to 13, 21 to 23, and 25 to 27 denote the same devices as represented in the embodiments described above. A current controller 30 matches an estimated q-axis component value Iqc with a current command Iq*.

Next, operations of an eighth embodiment will be explained. According to said embodiments shown in FIG. 10 through FIG. 13, a current command Iq* can be obtained without using an Iq* computing device 10. In addition, because an estimated q-axis component value Iqc can be computed from a detected DC current value I0, automatic control is possible so that Iqc agrees with the current command Iq*. FIG. 14 adds a current controller 30 to the control mechanism shown in FIG. 11. The current controller 30 is used to correct a voltage command Vqc* so that the estimated q-axis component value Iqc agrees with the current command Iq*. This configuration allows the current command Iq* to quickly agree with the estimated q-axis component value Iqc thereby further improving control performance. Further, the current controller for the q-axis component current Iq can be used for other embodiments, for example, embodiments shown in FIGS. 10, 12 and 13.

Embodiment 9

Figure 15:
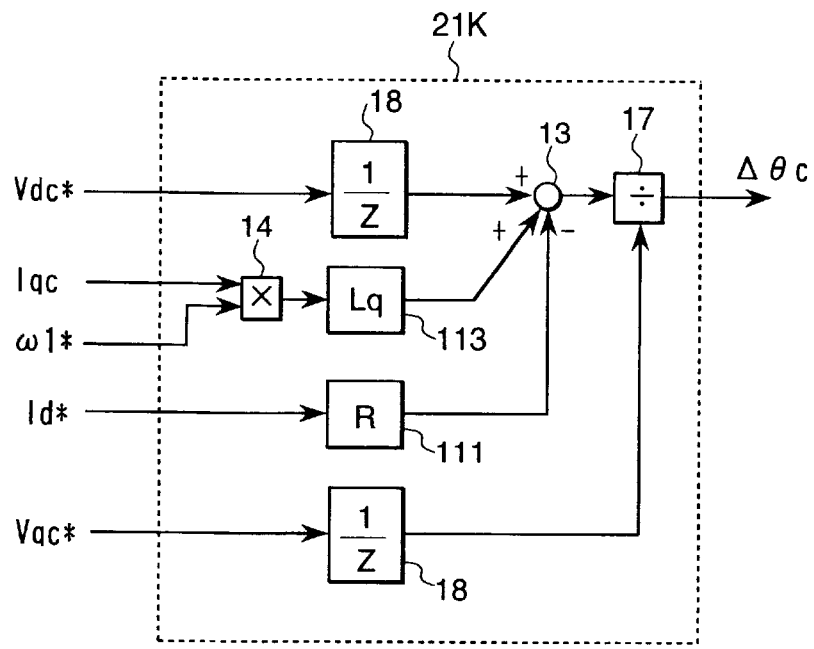
FIG. 15 is a configuration diagram of a ninth embodiment of the present invention.

A ninth embodiment of the present invention will be described with reference to FIG. 15. FIG. 15 shows the configuration of an axis error estimator 21K which is used instead of the axis error estimator 21 shown in each embodiment described above. In FIG. 15, reference numerals 13, 14, 17, 18, 111 and 113 denote the same devices as represented in the embodiments described above.

Next, operations of a ninth embodiment will be explained. In each embodiment mentioned above, an axis error computing device computes an estimated error value Δθc according to Equation (6) (FIG. 9). In this embodiment, the estimated error value Δθc is computed by the equation below. A voltage equation for the motor is as follows:

$$Vd = (R + sLd)Id - \omega 1 \cdot Lq \cdot Iq \qquad (7)$$

$$Vq = (R + sLq) - \omega 1 \cdot Ld \cdot Id + Ke \cdot \omega 1$$

According to the above equation, $$Iq = -\frac{1}{\omega 1 \cdot Lq}\{Vd - (R + sLd)Id\} \qquad (8)$$

The relation between voltage commands Vdc* and Vqc* and actual dq-axis voltages Vd and Vq of a synchronous motor is expressed with the following equation using an error Δθ:

$$Vd = Vdc^*\cos(\Delta\theta) - Vqc^*\sin(\Delta\theta) \qquad (9)$$

$$Vq = Vdc^*\sin(\Delta\theta) + Vqc^*\cos(\Delta\theta)$$

By Equation (8) and Equation (9), the following equation can be obtained:

$$Iq = \qquad (10)$$

$$-\frac{1}{\omega 1 \cdot Lq}\{Vdc^*\cos(\Delta\theta) - Vqc^*\sin(\Delta\theta) - (R + sLd)Id\} \therefore \sin(\Delta\theta) =$$

$$\frac{Vdc^*\cos(\Delta\theta) - (R + sLd)Id + \omega 1 \cdot Lq \cdot Iq}{Vqc^*}$$

wherein by approximating cosΔθ≈1, sinΔθ≈Δθ, the following equation can be obtained:

$$\Delta\theta = \frac{Vdc^* - (R + sLd)Id + \omega 1 \cdot Lq \cdot Iq}{Vqc^*} \qquad (11)$$

In the above equation, by ignoring the differential term, the following equation can be obtained:

$$\Delta\theta = \frac{Vdc^* - R \cdot Id + \omega 1 \cdot Lq \cdot Iq}{Vqc^*} \qquad (12)$$

If Id and Iq in Equation (12) are replaced with Id* and Iqc respectively and the equation is expressed by a block diagram, the configuration can be shown in FIG. 15. This configuration makes it possible to accurately estimate and compute the error AO throughout a wide range of the motor speeds, which increases the accuracy of the estimated error Δθc more than the configuration shown in FIG. 9. As a result, a highly accurate and high-performance motor drive system can be realized.

Embodiment 10

Figure 16:
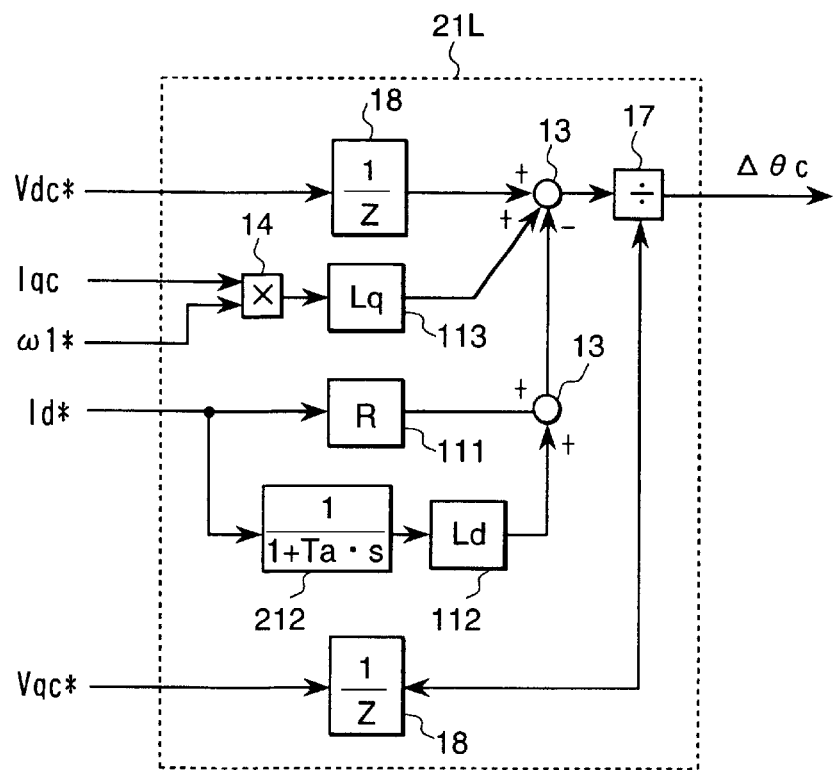
FIG. 16 is a configuration diagram of a tenth embodiment of the present invention.

A tenth embodiment of the present invention will be described with reference to FIG. 16. FIG. 16 shows the configuration of an axis error estimator 21L which is used instead of the axis error estimator 21 shown in the embodiments described above. In FIG. 16, reference numerals 13, 14, 17, 18, 111 and 113 denote the same devices as represented in the embodiments described above. Reference numeral 212 represents a control block of a lead element (differential or incomplete differential element).

Next, operations of a tenth embodiment will be explained. The difference between this embodiment and a ninth embodiment is that this embodiment does not ignore the differential term of said Equation (11) and is configured as shown in FIG. 16. This configuration allows the principle expression obtained by a voltage equation of the motor to be accurately reproduced including the differential term. Therefore, the axis error can be accurately computed even at the transient time. As a result, a highly accurate and high-performance motor drive system can be realized.

Embodiment 11

Figure 17:
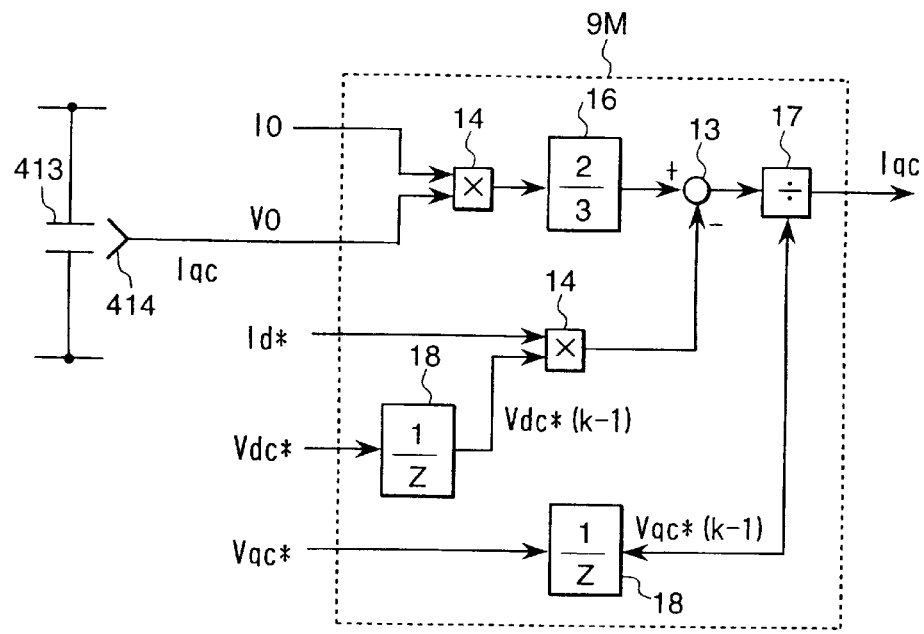
FIG. 17 is a configuration diagram of an eleventh embodiment of the present invention.

An eleventh embodiment of the present invention will be described with reference to FIG. 17. FIG. 17 shows the configuration of an Iq estimator 9M which is used instead of the Iq estimator 9 shown in the embodiments described above. In FIG. 17, reference numerals 13, 14, 16 to 18 and 413 denote the same devices as represented in the embodiments described above. A voltage sensor 414 detects the voltage of a smoothing capacitor 413.

The difference between this embodiment and an embodiment shown in FIG. 4 is that this embodiment employs the voltage sensor 414 which detects a DC voltage of an inverter and estimates and computes a torque current using the detected value V0. According to this embodiment, Iqc can be computed using a detected DC voltage value thereby enabling robust control despite fluctuations in DC voltage.

Embodiment 12

Figure 18:
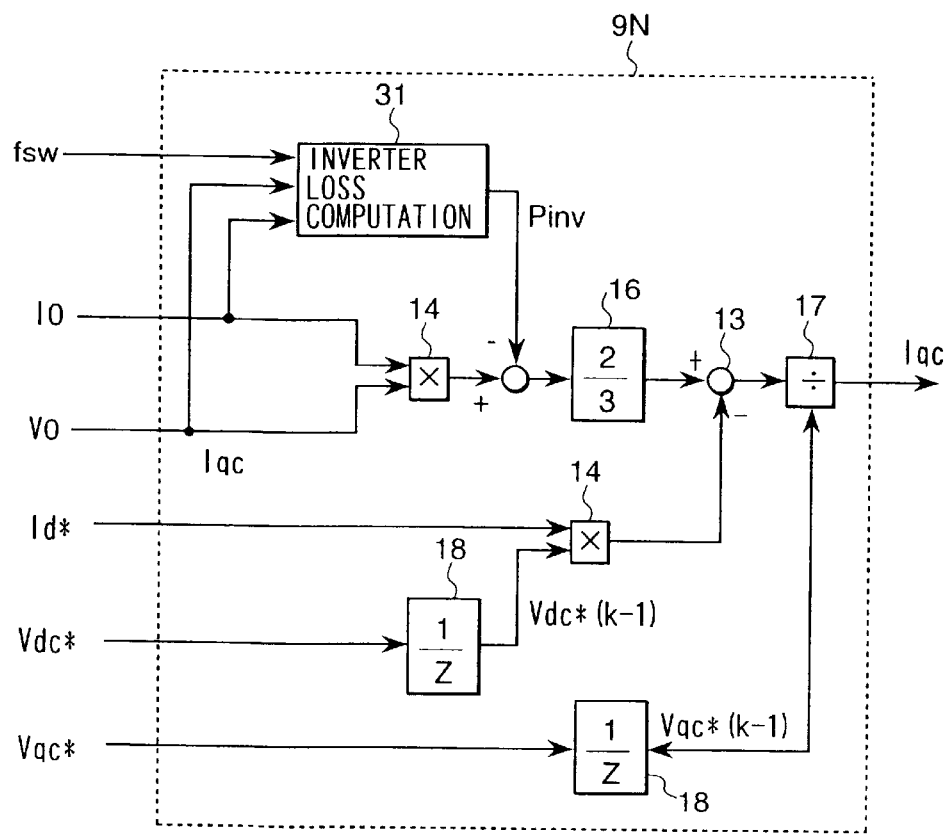
FIG. 18 is a configuration diagram of a twelfth embodiment of the present invention.

A twelfth embodiment of the present invention will be described with reference to FIG. 18. FIG. 18 shows the configuration of an Iq estimator 9N which is used instead of the Iq estimator 9 shown in the embodiments described above. In FIG. 18, reference numerals 13, 14, and 16 to 18 denote the same devices as represented in the embodiments described above. An inverter loss computing device 31 computes a loss consumed by an inverter. The difference between this embodiment and the embodiments shown in FIG. 9 and FIG. 17 is that this embodiment additionally employs the inverter loss computing device 31.

This embodiment computes an estimated q-axis component value Iqc by considering a loss consumed by an inverter. A relationship equation of the power including an inverter loss Pinv is shown by Equation (13).

$$I0 \cdot V0 = \frac{3}{2}(Vd \cdot Id + Vq \cdot Iq) + Pinv \tag{13}$$

wherein $Pinv = Kv \cdot fsw \cdot V0^2 + Ki \cdot I0^2$

In the above equation, fsw is an inverter's average switching frequency, Kv is a coefficient corresponding to a switching loss that occurs associated with switching operations, and Ki is a loss coefficient that is generated depending on the magnitude of the current flowing through the inverter. By computing an estimated q-axis component value Iqc according to Equation (13), the following equation can be obtained:

$$Iqc = \frac{\frac{2}{3}(I0 \cdot V0 - Pinv)}{Vqc^*} \tag{14}$$

FIG. 18 shows a block diagram of Equation (14). Coefficients Kv and Ki required for calculating Pinv in Equations (13) and (14) are obtained experimentally and specified beforehand.

Thus, by using an Iq estimator 9N shown in FIG. 18, it is possible to further accurately estimate the estimated q-axis component value Iqc considering a loss that occurs in the inverter.

Embodiment 13

Figure 19:
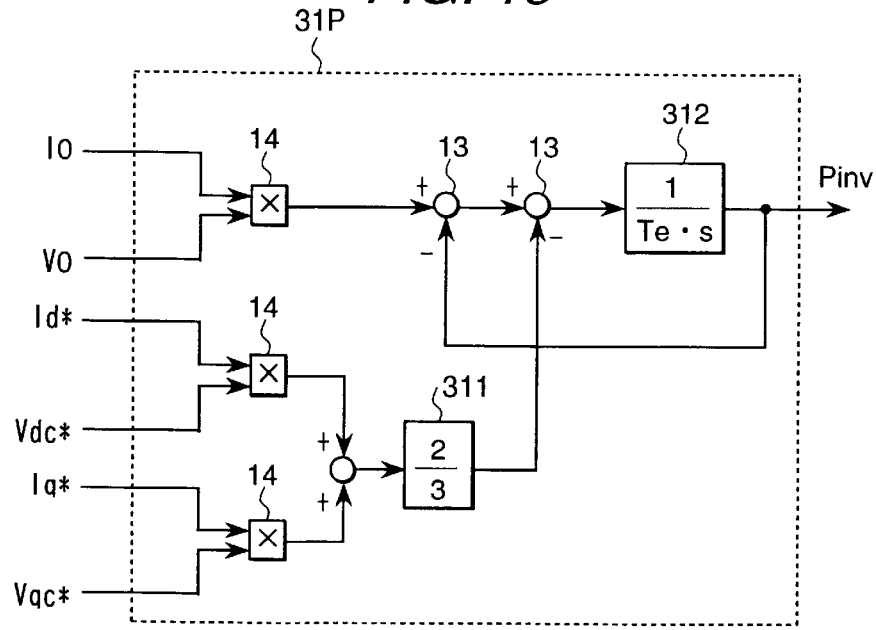
FIG. 19 is a configuration diagram of a thirteenth embodiment of the present invention.

A thirteenth embodiment of the present invention will be described with reference to FIG. 19. FIG. 19 shows the configuration of an inverter loss computing device 31P which is used instead of the inverter loss computing device 31 shown in FIG. 18. In FIG. 19, reference numerals 13 and 14 denote the same devices as represented in the embodiments described above. There are also shown a power conversion gain 311 and a loss estimator 312 which employs an integrator (time constant: Te). This embodiment estimates online an inverter loss and computes an estimated q-axis component value Iqc.

The difference between the left hand (DC input power) of Equation (13) and the right hand first term (power consumed by the motor) is the power consumed by an inverter. Therefore, the difference between power input and output is calculated and the obtained value is regarded as an inverter loss Pinv and then a correction is made to the estimated q-axis component value Iqc. In FIG. 19, the DC side power consumption and the motor side power consumption are calculated respectively, the difference between those values is integrated, and then an inverter loss Pinv is estimated.

Thus, by using an inverter loss computing device 31P shown in FIG. 19, it is possible to compute online an inverter loss and accurately calculate the estimated q-axis component value Iqc.

Embodiment 14

Figure 20:
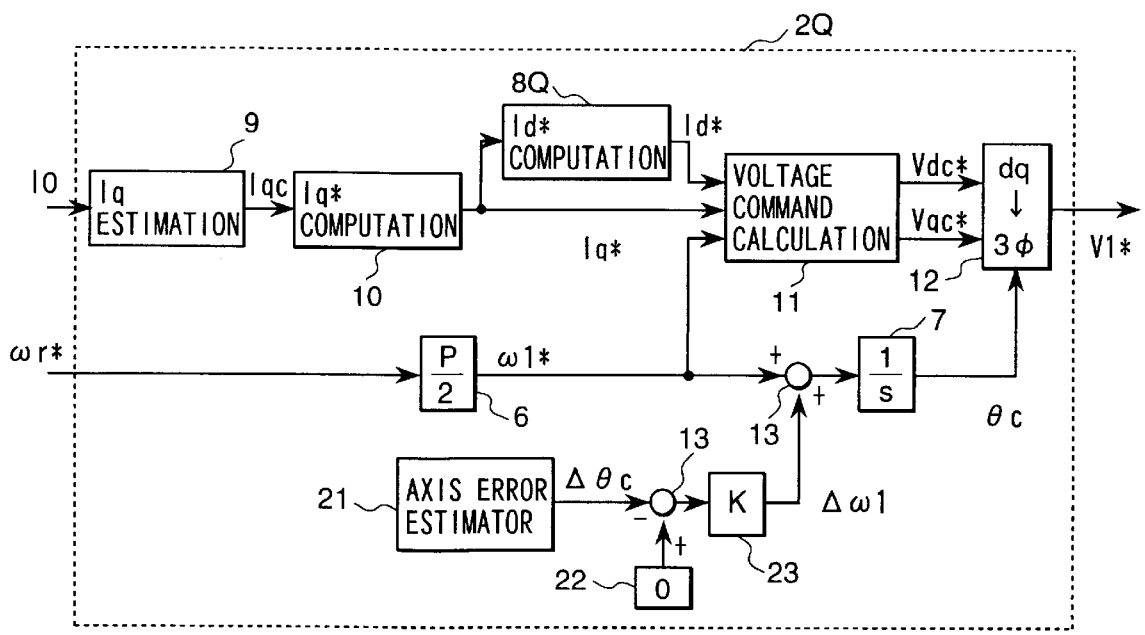
FIG. 20 is a configuration diagram of a fourteenth embodiment of the present invention.

A fourteenth embodiment of the present invention will be described with reference to FIG. 20. FIG. 20 shows the configuration of a controller 2Q which is used instead of the controller 2 shown in FIG. 1. In FIG. 20, reference numerals 6, 7, 9 to 13, and 21 to 23 denote the same devices as represented in the embodiments described above. An Id* generator 8Q determines the value of a current command Id* based on a current command Iq*.

Next, operations of a fourteenth embodiment will be explained. Permanent-magnet type motors include the one that generates motor torque by combining permanent magnet torque and reluctance torque generated by the salient property (reverse salient property) of the motor. In cases related to this type of motor, the maximum torque occurs where a minus motor current Id flows, and it is not advantageous for the control to be at Id=0 in terms of efficiency. Therefore, in cases where the motor is always being driven by a minimum current, i.e. maximum efficiency, it is recommended that the motor be always driven by the maximum torque. Requirements for obtaining the maximum torque is described in, for example, "Comparison of characteristics according to control method of the PM motor and structure of the rotor" on pages 662 to 667 of the proceedings D, No. 6, Vol. 114 issued in 1994 by the Institute of Electrical Engineers of Japan. According to Equation (5) described in this document, the following equation can be obtained:

$$Id = \frac{\phi m}{2(Lq-Ld)} - \sqrt{\frac{\phi m^2}{4(Lq-Ld)^2} + Iq^2} \quad (15)$$

wherein φm is a magnetic flux of a permanent magnet, and Ld≠Lq.

Accordingly, if a torque current component Iq is determined, a motor current Id required for obtaining the maximum torque can be determined.

In this embodiment, an Id* generator 8Q computes a motor current Id by Equation (15) using a current command Iq* so that a motor can be driven at the maximum torque, i.e. maximum efficiency. Although an estimated q-axis component value Iqc can be used for the computation by Equation (15) instead of using a current command Iq*, the estimated q-axis component value Iqc greatly fluctuates at the transient time, which may cause the entire control system to become unstable. Further, practically, it is sufficient if the maximum efficiency can be attained in a steady state. Therefore, there are no problems with using a current command Iq* which is the output of an Iq* computing device. Thus, this embodiment enables the motor to be driven at the maximum efficiency.

Embodiment 15

Figure 21:
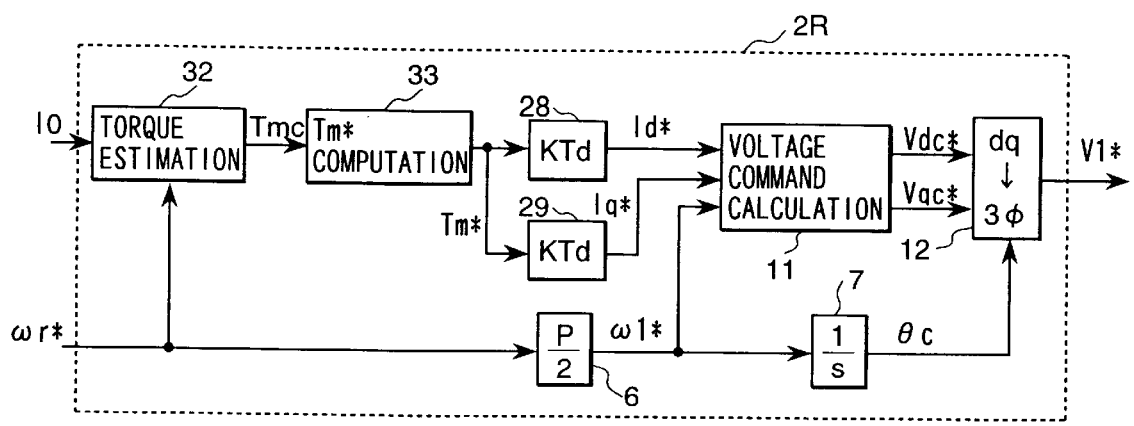
FIG. 21 is a configuration diagram of a fifteenth embodiment of the present invention.

A fifteenth embodiment of the present invention will be described with reference to FIG. 21 and FIG. 22. FIG. 21 shows the configuration of a controller 2R which is used instead of the controller 2 shown in FIG. 1. In FIG. 21, reference numerals 6, 7, 11, 12, 28 and 29 denote the same devices as represented in the embodiments described above. A torque estimator 32 estimates and computes motor torque based on a detected DC current value I0 and a Tm* computing device 33 computes a torque command Tm* based on an estimated torque value Tmc.

This embodiment directly estimates and computes motor torque. The relation between the motor torque and an output Pm is as follows:

$$Pm = \omega rTM \quad (16)$$

wherein Tm is motor torque and or is a rotational speed of the motor. Because DC side power consumption is equal to Equation (16), the motor torque can be directly estimated and computed as follows:

$$Tmc = \frac{I0 \cdot V0}{\omega r^*} \quad (17)$$

Figure 22:
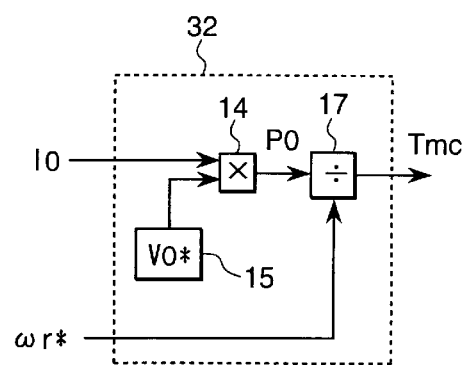
FIG. 22 is a configuration diagram of a torque estimator of a fifth embodiment.

FIG. 22 expresses Equation (17) in a block diagram.

In FIG. 21, a torque estimator 32 directly estimates and computes motor torque from a detected DC current value I0, and then a Tm* computing device computes a torque command Tm*. As shown in a first embodiment, a lag element (e.g. Equation (5)) is used for computing the torque command Tm*. After the torque command Tm* has been obtained, necessary current commands Id* and Iq* are created by using data tables 28 and 29. Data table 28 and 29 of a seventh embodiment (FIG. 13) may be used here.

This embodiment makes it possible to use a torque estimator to estimate motor torque. As a result, the most efficient motor control can be realized by a simple control mechanism, thereby realizing simple and highly generalized control.

Embodiment 16

Figure 23:
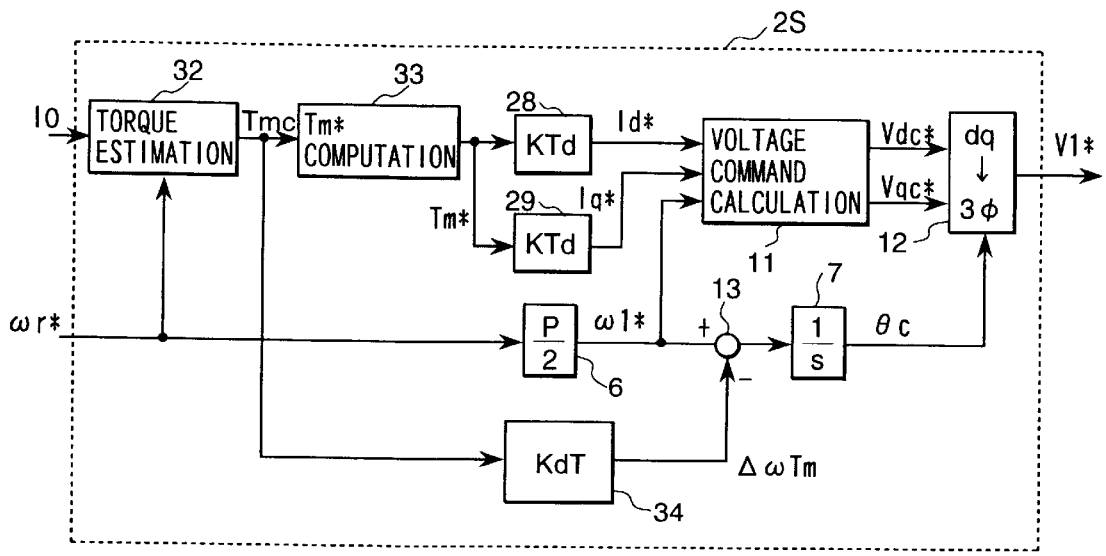
FIG. 23 is a configuration diagram of a sixteenth embodiment of the present invention.

A sixteenth embodiment of the present invention will be described with reference to FIG. 23. FIG. 23 shows the configuration of a controller 2S which is used instead of the controller 2 shown in FIG. 1. In FIG. 23, reference numerals 6, 7, 11, 12, 28, 29, 32 and 33 denote the same devices as represented in the embodiments described above. A torque damping gain 34 adds an adjustment value Δωq to an electrical angle frequency command ω1* using an estimated torque value Tmc. This embodiment adds the torque damping gain 34 to an embodiment shown in FIG. 21.

Because a torque estimator 32 can instantaneously detect actual motor torque, load fluctuations of the motor appear as changes of an estimated torque value Tmc. Therefore, if an electrical angle frequency command ω1* is corrected using an estimated torque value Tmc, it is possible to prevent step-out of the motor by changing the rotational speed of the motor according to load disturbance. Further, a correction amount ΔωTm of the electrical angle frequency command ω1* must be zero in a steady state. Therefore, a torque damping gain 34 may consist of differential elements or incomplete differential elements.

Thus, this embodiment ensures stable drive of the motor regardless of load fluctuations.

Embodiment 17

Figure 24:
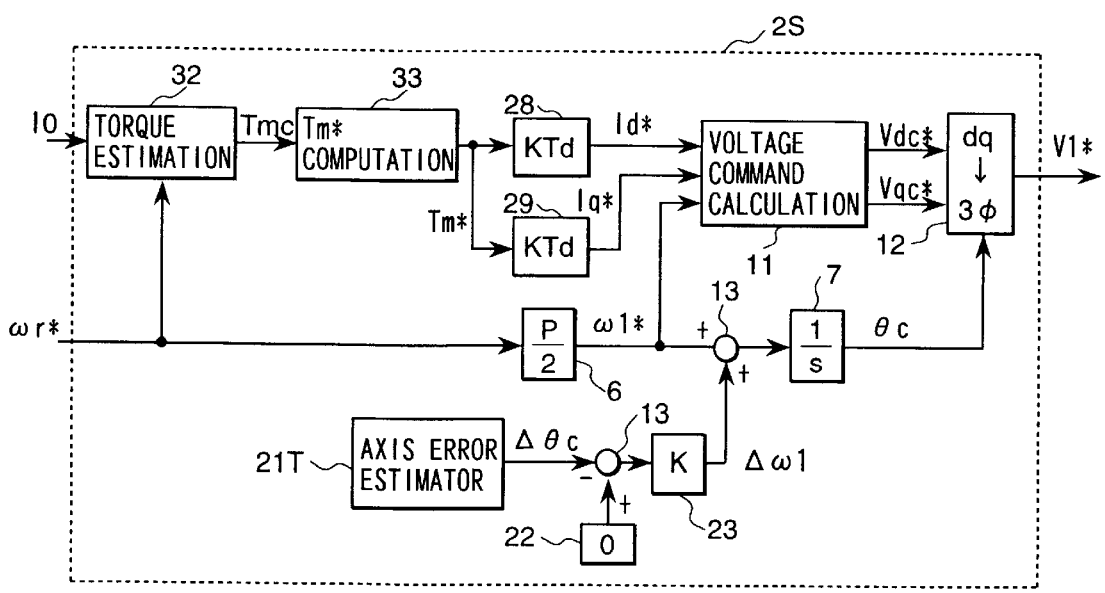
FIG. 24 is a configuration diagram of a seventeenth embodiment of the present invention.

A seventeenth embodiment of the present invention will be described with reference to FIG. 24 and FIG. 25. FIG. 24 shows the configuration of a controller 2T which is used instead of the controller 2 shown in FIG. 1. In FIG. 24, reference numerals 6, 7, 11 to 13, 22, 23, 28, 29, 32 and 33 denote the same devices as represented in the embodiments described above. An axis error estimator 21T estimates and computes the axis error between the magnetic pole axis of the motor and the control axis.

Next, operations of a seventeenth embodiment shown in FIG. 24 will be explained. This embodiment adds the devices represented by reference numerals 21T, 22 and 23 to the controller 2R shown in FIG. 21. An axis error estimator 21T computes an estimated error value Δθc by the following equation based on a torque command Tm* and an estimated torque value Tmc:

$$\Delta\theta c = Kth(Tmc - Tm^*) \quad (18)$$

Figure 25:
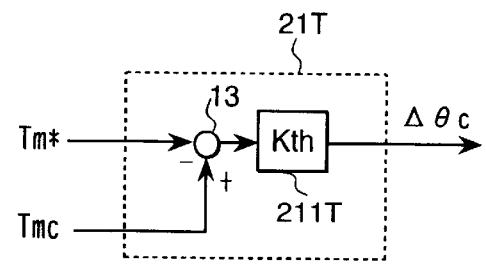
FIG. 25 is a configuration diagram of an axis error estimator of a seventeenth embodiment.

FIG. 25 expresses Equation (18) in a block diagram. In FIG. 25, reference numeral 211T denotes a proportional gain Kth used for axis error computation. If a torque command Tm* agrees with an estimated torque value Tmc at that point, the error AO can be regarded as zero. If those values are different, it can be said that the error Δθ proportional to the value difference is occurring between the dq-axis and the dc-qc-axis. Therefore, as shown in Equation (18), by computing the difference between the torque command Tm* and the estimated torque value Tmc via the proportional gain Kth, the error Δθ can be estimated. After the estimated error value Δθc has been obtained, as shown in the embodiments described above, it is possible to control the estimated error value Δθc to become zero by correcting an AC phase θc via a magnetic pole axis estimation gain 23.

Embodiment 18

Figure 26:
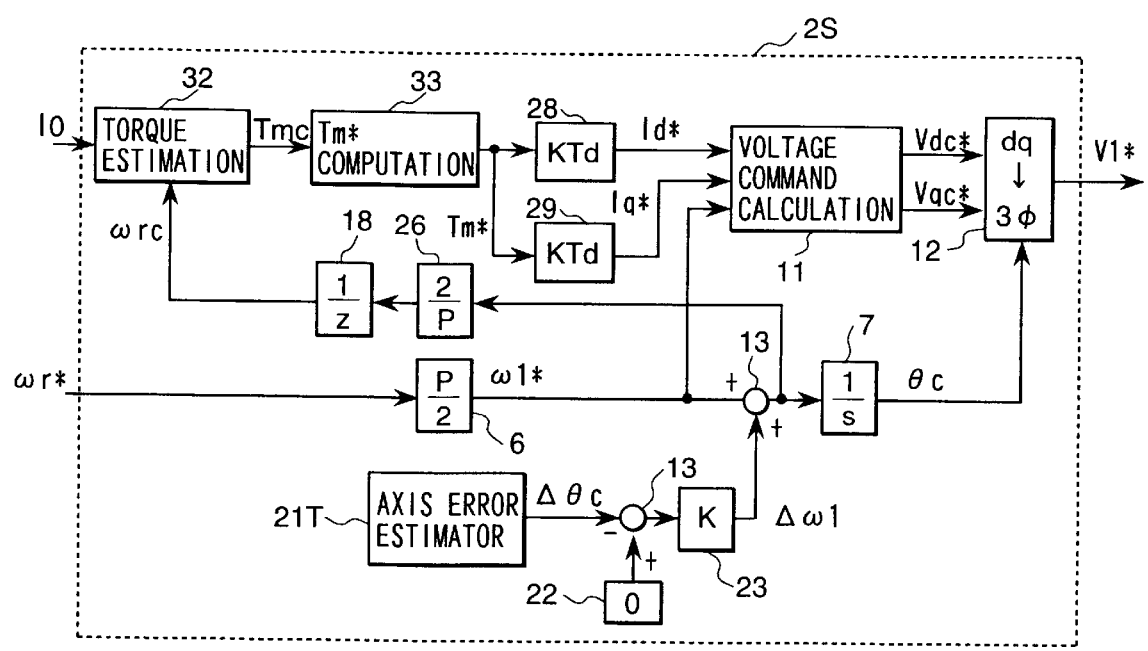
FIG. 26 is a configuration diagram of an eighteenth embodiment of the present invention.

An eighteenth embodiment of the present invention will be described with reference to FIG. 26. FIG. 26 shows the configuration of a controller 2U which is used instead of the controller 2 shown in FIG. 1. In FIG. 26, reference numerals 6, 7, 11 to 13, 18, 21T, 22, 23, 26, 28, 29, 32 and 33 denote the same devices as represented in the embodiments described above. The difference between this embodiment and an embodiment shown in FIG. 24 is that this embodiment uses an estimated rotational speed value ωrc for torque estimation computation instead of using a rotational speed command ωr*.

As shown in FIG. 26, a value of an electrical angle frequency, which has been obtained by adding a correction amount Δω1 to an electrical angle frequency command ω1*, is converted to a mechanical angle frequency via a conversion gain 26. This value is the estimated rotational speed value arc. The relation between motor torque and the power is expressed with Equation (16). This equation indicates that using an actual rotational speed can obtain a more theoretically accurate value. Therefore, highly accurate torque estimation can be obtained by performing calculations using an estimated speed value instead of using a rotational speed command. Thus, this embodiment makes it possible to accurately estimate torque.

Embodiment 19

Figure 27:
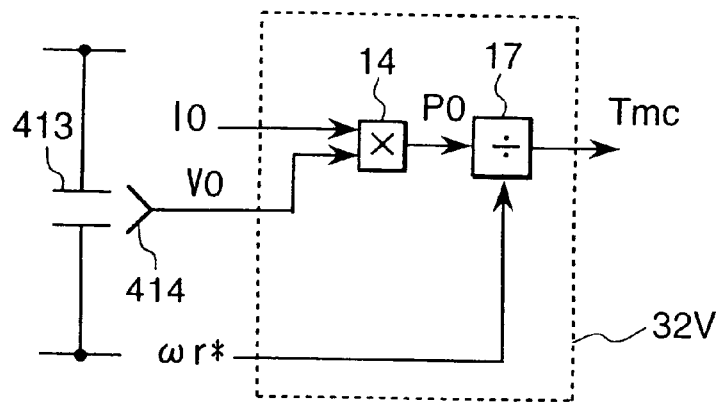
FIG. 27 is a configuration diagram of a nineteenth embodiment of the present invention.

A nineteenth embodiment of the present invention will be described with reference to FIG. 27. FIG. 27 shows the configuration of a torque estimator 32V which is used instead of a torque estimator 32 shown in the embodiments described above. In FIG. 27, reference numerals 14, 17, 413 and 414 denote the same devices as represented in the embodiments described above. A torque estimator of this embodiment employs a voltage sensor 414 which detects a DC voltage of an inverter and use the detected DC voltage value V0 to compute an estimated torque value Tmc. According to this embodiment, the estimated torque value Tmc can be computed using the detected DC voltage value. Accordingly, a robust control is possible regardless of fluctuations in power supply voltage or fluctuations of the DC voltage associated with motor load fluctuations.

Embodiment 20

Figure 28:
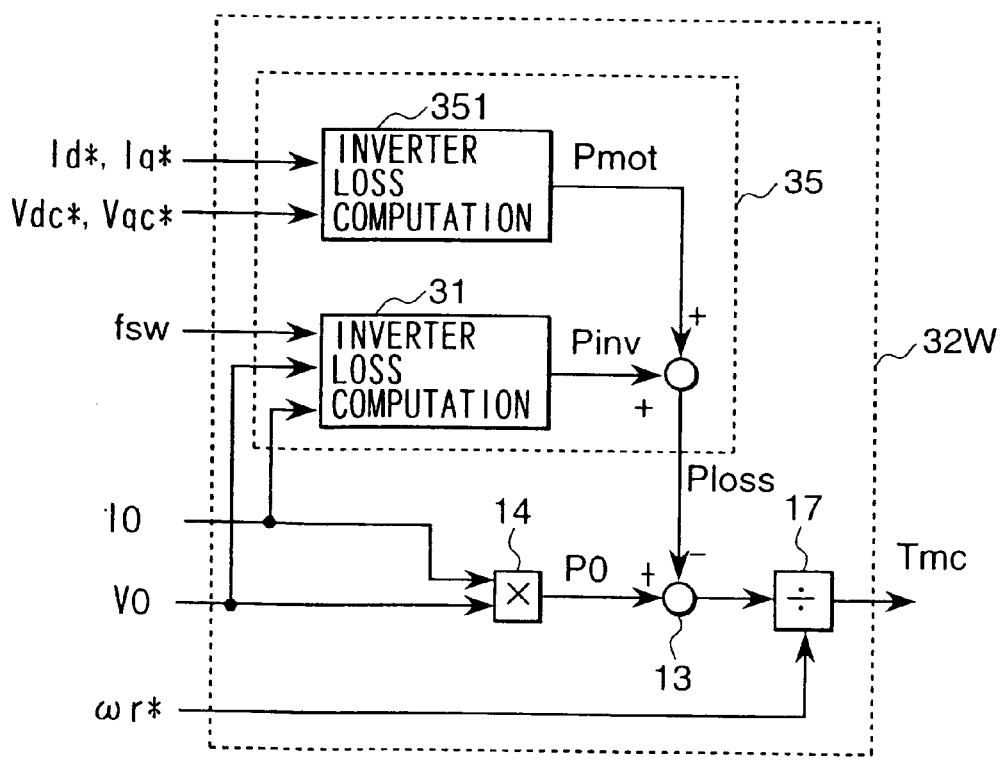
FIG. 28 is a configuration diagram of a twentieth embodiment of the present invention.

A twentieth embodiment of the present invention will be described with reference to FIG. 28. FIG. 28 shows the configuration of a torque estimator 32W which is used instead of a torque estimator 32 or a torque estimator 32V shown in the embodiments described above. In FIG. 28, reference numerals 13, 14, 17 and 31 denote the same devices as represented in the embodiments described above. A total-loss computing device 35 computes a total-loss Ploss except for a motor torque output. A motor loss computing device 351 computes a copper loss and a core loss of the motor.

The difference between this embodiment and an embodiment shown in FIG. 22 or 27 is that this embodiment adds a total-loss computing device 35 which consists of an inverter loss computing device 31 and a motor loss computing device 351. As is the case with the embodiment shown in FIG. 18, this embodiment employs a total-loss computing device 35 which computes total loss to compute an estimated torque value Tmc. An inverter loss computing device 31 of the total-loss computing device is the same one as the above-described embodiments, and thereby explanation is omitted herein. Further, a motor loss computing device 351 computes a motor loss Pmot according to the following equation:

$$Ploss = Kr(Id^{*2} + Iq^{*2}) + Km(Vdc^{*2} + Vqc^{*2}) \quad (19)$$

In the above equation, Kr is a loss caused by a copper loss of the motor, and Krm is a loss caused by the copper loss of the core loss. The total loss Ploss becomes as follows:

$$Ploss = Pinv + Pmot \quad (20)$$

FIG. 28 shows the configuration of torque estimation which considers a loss occurring in the above equation. Thus, using a torque estimator shown in FIG. 28 makes it possible to take into account losses that occur in the inverter and in the motor, thereby further accurately calculating an estimated torque value Tmc.

Embodiment 21

Figure 29:
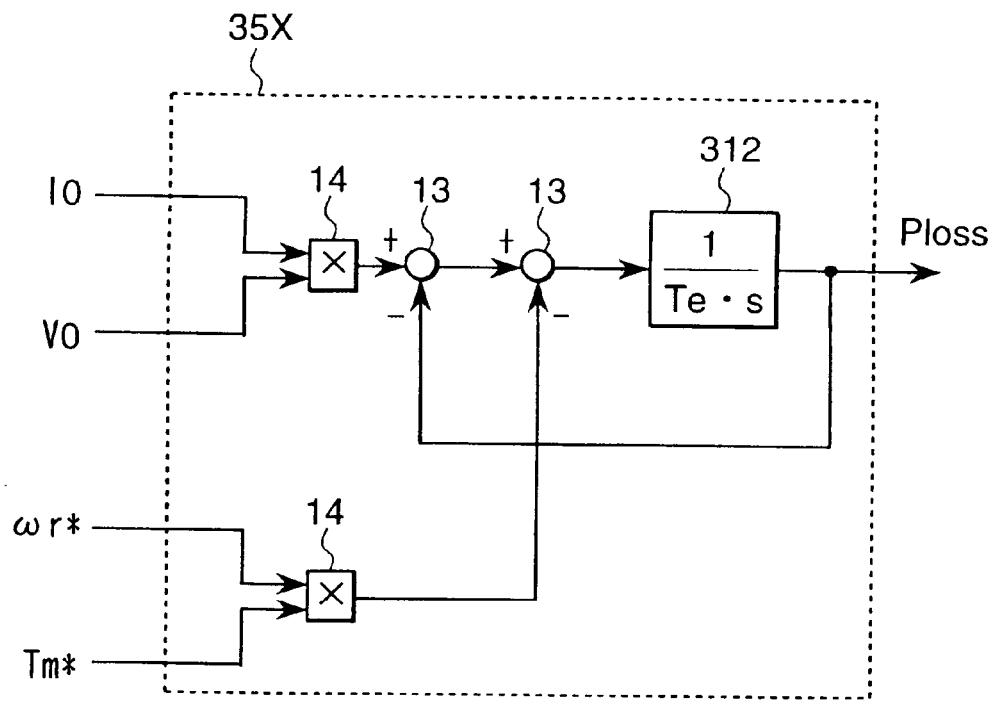
FIG. 29 is a configuration diagram of a twenty-first embodiment of the present invention.

A twenty-first embodiment of the present invention will be described with reference to FIG. 29. FIG. 29 shows the configuration of a total-loss computing device 35X which is used instead of a total-loss computing device 35 shown in FIG. 28. In FIG. 29, reference numerals 13, 14, and 312 denote the same devices as represented in the embodiments described above. This embodiment estimates online a total loss except for a torque output and improves the accuracy of torque estimation and computation. The relation among DC input power P0, total-loss Ploss and torque Tm is as follows:

$$P0 = \omega r \cdot Tm + Ploss \quad (21)$$

According to the above equation, by computing a difference between a torque output Pm (=ωr·Tm) and input power P0 and then estimating and computing a Ploss, a loss component can be obtained online. FIG. 29 expresses these operations. In FIG. 29, the DC side power consumption and a motor torque output are computed respectively, and then the difference between those values are integrated to estimate the total-loss Ploss.

Thus, using an inverter loss computing device of this embodiment makes it possible to compute online a loss except for a torque output, thereby further accurately estimating an estimated torque value Tmc.

Embodiment 22

Figure 30:
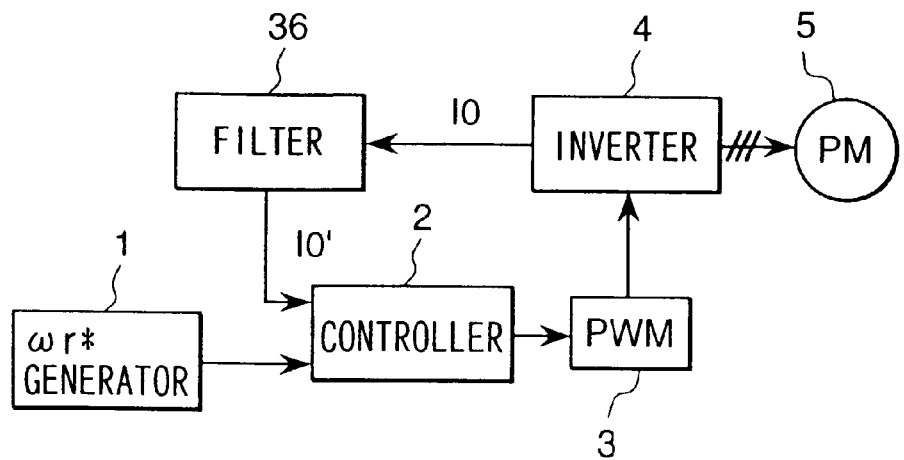
FIG. 30 is a configuration diagram of a twenty-second embodiment of the present invention.
Figure 31:
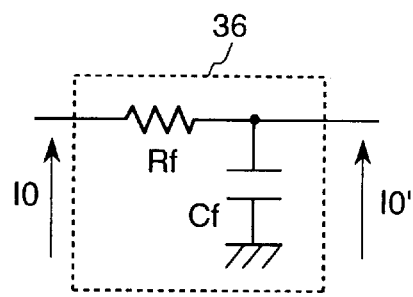
FIG. 31 is a configuration diagram of a filter of a twenty-third embodiment.

A twenty-second embodiment of the present invention will be described with reference to FIG. 30 and FIG. 31. FIG. 30 shows the configuration of a drive system for a synchronous motor of this embodiment. This embodiment adds a filter 36 to a detected DC current value I0 used for the embodiments described above. The filter 36 eliminates higher harmonics components included in the detected DC current value I0. The filter 36 is, for example, a first-order lag filter which consists of a capacitor Cf and a resistor Rf shown in FIG. 31.

An actually detected DC current value I0 is, for example, a waveform accompanied by ripple components shown in FIG. 32(b). A value required for realizing the embodiments described above is an average value of a DC current (I0m in FIG. 32(b)). Therefore, it is difficult to directly use the detected DC current value I0 for computation. Although there is a way to sample a DC current for a shorter time than the triangular wave carrier period and obtain an average value, this method requires fast computation and is not practical. Therefore, the filter shown in FIG. 31 is inserted to eliminate ripple components associated by switching operations of an inverter and detect an average value of the DC current. Further, by setting the time constant Tf (=Cf·Rf) of the filter so that it is longer than the average switching period (i.e. a period of a triangular wave carrier) of an inverter, major ripple components can be eliminated. The filter of this embodiment can be applied to all of the embodiments described above.

Embodiment 23

Figure 32:
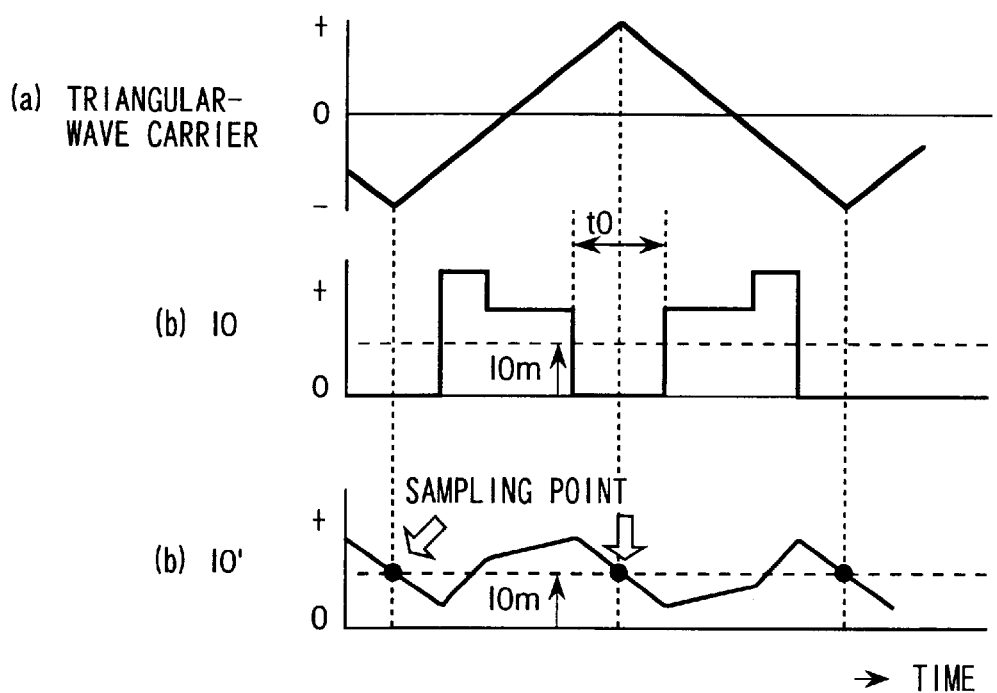
FIG. 32 shows the operational waveform of a twenty-third embodiment.

A twenty-third embodiment of the present invention will be described with reference to FIG. 32. This embodiment is a DC current detection method which minimizes the filter time constant and is not affected by ripple components. FIG. 32 shows the operational waveform of a twenty-second embodiment. FIG. 32(a) shows a triangular wave carrier used for creating a PWM pulse shape, FIG. 32 (b) shows a detected DC current value I0, and FIG. 32(c) shows the waveform (I0') of the detected DC current value I0 which has passed through the filter 36. Because the filter time constant is set as small as possible, the value I0 contains ripple components of higher harmonics.

The detected DC current value I0 shown in FIG. 32(*b*) becomes a waveform which synchronizes with a triangular wave carrier, and always becomes zero at the peak (i.e. the peak on both the positive side and the negative side) of the triangular wave carrier. In a state where a detected DC current value I0 is zero, upper side switching elements of an inverter are all turned on (i.e. Sup, Svp, and Swp in FIG. 1 are all on) or lower side switching elements are all turned on (i.e. Sun, Svn, and Swn in FIG. 1 are all on). In this condition, the DC power source is separated from the inverter.

During periods (i.e. period t0 in FIG. 32) when the detected DC current value I0 is zero, a current I0' which has passed through the filter moderately changes and always intersects with an average value I0*m*. Therefore, by sampling I0' considering the timing of the period t0 and using the value for control, it is possible to read an average value of the detected DC current value I0 necessary for control. There are no problems even if a current I0' which has passed through the filter contains a couple of ripples. As a result, according to this embodiment, the time constant of the DC current detection filter is set at the minimum value, and it is possible to realize a high-performance motor drive system without deteriorating the control response performance.

A motor drive system in accordance with the present invention makes it possible to realize a high-performance and highly accurate motor drive system having a simple control mechanism which does not use position and speed sensors or a motor current sensor for controlling the motor. As a result, reliability and stability of the motor drive system can be increased.

What is claimed is:

1. A synchronous motor drive system comprising a synchronous motor, an inverter which applies alternating current to the synchronous motor, direct current power source which supplies power to the inverter, means for detecting a current supplied from the direct current power source to said inverter, means for giving a rotation command to said synchronous motor, means for giving current commands Id* and Iq*, Id* on the dc-axis that is assumed to be the magnetic pole axis located inside said synchronous motor and Iq* on the qc-axis that is perpendicular to the dc-axis, and means for computing dc-qc-axis voltage commands based on said current commands Id* and Iq* and said rotation command;

said synchronous motor drive system sending control signals to said inverter based on the voltage commands for controlling said synchronous motor;

wherein torque current components inside said synchronous motor are estimated and computed based on the detected current value of said direct current power source, and then said qc-axis component current command Iq* is generated based on the computed value.

2. A synchronous motor drive system comprising a synchronous motor, an inverter which applies alternating current to the synchronous motor, a direct current power source which supplies power to the inverter, means for detecting a current supplied from the direct current power source to said inverter, means for giving a rotation command to said synchronous motor, means for computing an alternating current phase of said synchronous motor based on the rotation command, and means for computing voltage commands applied to said synchronous motor; wherein:

said synchronous motor drive system sends control signals to said inverter based on the voltage commands for controlling said motor;

a corrected current value is formed by performing a differential or partial differential correction to a detected current value of said direct current power source; and said alternating current phase is corrected using the corrected current value.

3. A synchronous motor drive system according to claim 2, wherein torque current components inside said synchronous motor are estimated and computed based on the detected current value of said direct current power source, and then said alternating current phase is corrected based on the computed value.

4. A synchronous motor drive system according to claim 3, wherein the error $\Delta\alpha$ between the magnetic pole axis (d-axis) located inside said synchronous motor and said dc-axis is computed using the detected current value of said direct current power source or the estimated value of said torque current component, and then said alternating current phase is corrected based on the error $\Delta\theta$.

5. A synchronous motor drive system comprising a synchronous motor, an inverter which applies alternating current to the synchronous motor, a direct current power source which supplies power to the inverter, means for detecting a current supplied from the direct current power source to said inverter, means for giving a rotation command to said synchronous motor, means for giving current commands Id* and Iq*, Id* on the dc-axis that is assumed to be the magnetic pole axis (d-axis) located inside said synchronous motor and Iq* on the qc-axis that is perpendicular to the dc-axis, and means for computing said dc-qc-axis voltage commands based on the current commands Id* and Iq* said rotation command;

said synchronous motor drive system sending control signals to said inverter based on the voltage commands for controlling said synchronous motor;

said synchronous motor drive system further comprising means for estimating and computing a torque current component which is perpendicular to the magnetic pole axis located inside said synchronous motor, based on the detected current value of said direct current power source, means for computing the error $\Delta\theta$ between said d-axis and said dc-axis using the estimated value of said torque current component, and means for generating said current command Iq* based on the error $\Delta\theta$.

6. A synchronous motor drive system a synchronous motor, an inverter which applies alternating current to the synchronous motor, a direct current power source which supplies power to the inverter, means for detecting a current supplied from the direct current power source to said inverter, means for giving a rotation command to said synchronous motor, means for computing an alternating current phase of said synchronous motor based on the rotation command, means for giving current commands Id* and Iq*, Id* on the dc-axis that is assumed to be the magnetic pole axis (d-axis) located inside said synchronous motor and Iq* on the qc-axis that is perpendicular to the dc-axis, and means for computing said dc-qc-axis voltage commands based on the current commands and said rotation command;

said synchronous motor drive system sending control signals to said inverter based on the voltage commands for controlling said synchronous motor;

said synchronous motor drive system further means for estimating and computing a torque current component which is perpendicular to the magnetic pole axis located inside said synchronous motor, based on the detected current value of said direct current power source, means for computing the error Δθ between said d-axis and said dc-axis using the estimated value of said torque current component and correcting said alternating current phase based on the obtained error Δθ, and means for generating a current command Iq* based on an adjusted amount for correcting said alternating current phase.

7. A synchronous motor drive system comprising a synchronous motor, an inverter which applies alternating current to the synchronous motor, a direct current power source which supplies power to the inverter, means for detecting a current supplied from the direct current power source to said inverter, means for giving a rotation command to said synchronous motor, means for giving current commands Id* and Iq*, Id* on the dc-axis that is assumed to be the magnetic pole axis (d-axis) located inside said synchronous motor and Iq* on the qc-axis that is perpendicular to the dc-axis, and means for computing said dc-qc-axis voltage commands based on the current commands and said rotation command;

said synchronous motor drive system sending control signals to said inverter based on the voltage commands for controlling said synchronous motor;

said synchronous motor drive system further comprising means for estimating and computing a torque current component which is perpendicular to the magnetic pole axis located inside said synchronous motor, based on the detected current value of said direct current power source, means for computing the error Δθ between said d-axis and said dc-axis using the estimated value Iqc of said torque current component and estimating rotation of said synchronous motor based on the obtained error Δθ, means for computing an alternating current phase of said synchronous motor based on the estimated value of said rotation, and means for generating a current command Iq* based on the deviation between said rotation command and the estimated value of said rotation.

8. Synchronous motor drive system according to claim 5, further comprising means for correcting said voltage commands based on the deviation between said current command Iq* and the estimated value Iqc of said torque current component.

9. A synchronous motor drive system according to claim 4, wherein said error Δθ is computed by the following Equation (12):

$$\Delta\theta = \frac{Vdc^* - R \cdot Id + \omega 1 \cdot Lq \cdot Iq}{Vqc^*}$$

wherein Vdc* is a dc-axis voltage command, Vqc* is a qc-axis voltage command, ω1 is an electrical angle frequency of the motor, R is wire-wound resistance of the motor, Lq is q-axis inductance of the motor, and Iqc is an estimated torque current value.

10. A synchronous motor drive system according to claim 5, wherein said error Δθ is computed by the following Equation (11):

$$\Delta\theta = \frac{Vdc^* - (R + sLd)Id + \omega 1 \cdot Lq \cdot Iq}{Vqc^*}$$

11. A synchronous motor drive system according to claim 1, further comprising means for detecting the voltage of said direct current power source, wherein torque current component inside said synchronous motor is computed using said detected voltage value.

12. A synchronous motor drive system according to claim 1, wherein torque current component inside said synchronous motor is calculated by subtracting a loss consumed by an inverter.

13. A synchronous motor drive system according to claim 12, further comprising means for computing direct current input power of said inverter, means for computing the power consumed by said synchronous motor, and means for calculating said inverter loss from the difference between said direct current input power and the power consumed by said synchronous motor, wherein torque current component inside said synchronous motor is calculated using the estimated value of said inverter loss.

14. A synchronous motor drive system according to claim 1, wherein said dc-axis voltage command Id* is computed using any one of the detected DC current value, current command Iq*, or estimated value Iqc of said torque current component.

15. A synchronous motor drive system comp sing a synchronous motor, an inverter which applies alternating current to the synchronous motor, a direct current power source which supplies power to the inverter, means for detecting a current supplied from the direct current power source to said inverter, means for giving rotation command to said synchronous motor, means for giving a torque command to said synchronous motor, and means for computing voltage commands of said synchronous motor based on said torque command and said rotation command;

said synchronous motor drive system sending control signals to said inverter based on the voltage commands for controlling said synchronous motor;

wherein torque occurring inside said synchronous motor is computed using the detected current value of said direct current power source and then said torque command is generated based on the computed value Tmc.

16. A synchronous motor drive system according to claim 15, further comprising means for computing an alternating current phase of said synchronous motor based on said rotation command, wherein said alternating current phase is corrected based on the computed torque value Tmc inside said synchronous motor.

17. A synchronous motor drive system according to claim 15, further comprising means for computing an alternating current phase of sa d synchronous motor based on said rotation command, wherein the error Δθ between said d-axis and said dc-axis is computed using the detected current value of said DC power source or said computed torque value Tmc and then said alternating current phase is corrected based on the error Δθ.

18. A synchronous motor drive system according to claim 17, wherein, when said synchronous motor torque is estimated and computed, said rotation command is corrected based on said error Δθ and said torque Tmc is computed using the corrected rotation command.

19. A synchronous motor drive system according to claim 15, further comprising means for detecting said direct current power supply voltage, wherein said torque Tmc is computed using the detected voltage value of said direct current power source.

20. A synchronous motor drive system according to claim 15, wherein said torque Tmc is computed by subtracting a loss consumed by said inverter.

21. A synchronous motor drive system according to claim 20, further comprising means for computing direct current power that is input into said inverter, means for computing torque output of said synchronous motor, and means for calculating power loss consumed by said inverter and said synchronous motor using the difference between said direct current input power and torque output.

22. A synchronous motor drive system according to claim 1, further comprising a filter that eliminates high frequency components of the detected current value of said direct current power source, wherein the filter time constant is made more than an average period of ripple component contained in said detected current.

23. A synchronous motor drive system according t claim 22, wherein said inverter is a full bridge comprising plus-side and minus-side semiconductor switching elements for each phase, said switching elements consisting of said full ridge sampling the detected value of the current, which has passed through said filter, in the state where the plus-side switching elements are all on or in the state where the minus-side switching elements are all on and obtaining the detected current value of said direct current power source.

* * * * *